(12) United States Patent
Lockhart et al.

(10) Patent No.: US 9,558,202 B2
(45) Date of Patent: Jan. 31, 2017

(54) SERVER SIDE TECHNIQUES FOR REDUCING DATABASE WORKLOAD IN IMPLEMENTING SELECTIVE SUBFOLDER SYNCHRONIZATION IN A CLOUD-BASED ENVIRONMENT

(71) Applicant: Box, Inc., Los Altos, CA (US)

(72) Inventors: Kimber Lockhart, Mountain View, CA (US); Adam Platti, Palo Alto, CA (US); Joy Ebertz, San Jose, CA (US); Nicholas Silva, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/010,851

(22) Filed: Aug. 27, 2013

(65) Prior Publication Data

US 2014/0059002 A1    Feb. 27, 2014

Related U.S. Application Data

(60) Provisional application No. 61/693,521, filed on Aug. 27, 2012.

(51) Int. Cl.
*G06F 17/30*    (2006.01)
(52) U.S. Cl.
CPC ................ *G06F 17/30174* (2013.01)
(58) Field of Classification Search
USPC ........................................................ 707/620
See application file for complete search history.

(56) References Cited

U.S. PATENT DOCUMENTS 858,619 A    7/1907    O'Farrell
5,043,876 A    8/1991    Terry
(Continued)

FOREIGN PATENT DOCUMENTS

CA    2724521    11/2009
CN    101997924 A    3/2011
(Continued)

OTHER PUBLICATIONS

How-to Geek, "How to Sync Specific Folders With Dropbox", originally written on Jun. 2010 and archived version retrieved from WaybackMachine as published online on Jun. 4, 2010 at http://www.howtogeek.com/howto/18285/sync-specific-folders-with-dropbox/.*

(Continued)

*Primary Examiner* — Amresh Singh
(74) *Attorney, Agent, or Firm* — Perkins Coie LLP

(57) ABSTRACT

Techniques are disclosed for reducing database workload in implementing selective subfolder synchronization in a cloud-based environment. In one embodiment, a method comprises, in response to a selection, from a user, of a first synchronization state of a first folder in the workspace, synchronizing content of the first folder in the workspace with a corresponding folder on devices of a user (and collaborators) based on the first synchronization state. The workspace is shared among the user and one or more collaborators of the user. In some embodiments, the method further comprises determining the first synchronization state of the first folder based on synchronization states of one or more folders, other than the first folder, that are related to the first folder. The entries can be configured to identify hierarchical relationships between the one or more folders and the first folder on a per-user basis.

30 Claims, 14 Drawing Sheets

(56) References Cited

U.S. PATENT DOCUMENTS

| | | | |
|---|---|---|---|
| 5,748,735 A | 5/1998 | Ganesan | |
| 5,774,717 A | 6/1998 | Porcaro | |
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,999,908 A | 12/1999 | Abelow | |
| 6,016,467 A | 1/2000 | Newsted et al. | |
| 6,034,621 A * | 3/2000 | Kaufman | 340/7.21 |
| 6,055,543 A | 4/2000 | Christensen et al. | |
| 6,073,161 A | 6/2000 | DeBoskey et al. | |
| 6,098,078 A | 8/2000 | Gehani et al. | |
| 6,226,618 B1 | 5/2001 | Downs et al. | |
| 6,233,600 B1 | 5/2001 | Salas et al. | |
| 6,260,040 B1 | 7/2001 | Kauffman et al. | |
| 6,279,109 B1 | 8/2001 | Brundridge | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,441,641 B1 | 8/2002 | Pang et al. | |
| 6,446,091 B1 | 9/2002 | Noren et al. | |
| 6,449,622 B1 | 9/2002 | LaRue et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,636,897 B1 | 10/2003 | Sherman et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 7,003,667 B1 | 2/2006 | Slick et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,080,104 B2 * | 7/2006 | Ring | G06F 17/30575 |
| 7,130,831 B2 | 10/2006 | Howard et al. | |
| 7,133,834 B1 | 11/2006 | Abelow | |
| 7,143,136 B1 | 11/2006 | Drenan et al. | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,171,468 B2 | 1/2007 | Yeung et al. | |
| 7,178,021 B1 | 2/2007 | Hanna et al. | |
| 7,222,078 B2 | 5/2007 | Abelow | |
| 7,275,244 B1 | 9/2007 | Bell et al. | |
| 7,296,025 B2 | 11/2007 | Kung et al. | |
| 7,346,778 B1 | 3/2008 | Guiter et al. | |
| 7,353,252 B1 | 4/2008 | Yang et al. | |
| 7,362,868 B2 | 4/2008 | Madoukh et al. | |
| 7,363,330 B1 | 4/2008 | Ellman et al. | |
| 7,370,269 B1 | 5/2008 | Prabhu et al. | |
| 7,380,120 B1 | 5/2008 | Garcia | |
| 7,386,535 B1 | 6/2008 | Kalucha et al. | |
| 7,401,117 B2 | 7/2008 | Dan et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,653,668 B1 | 1/2010 | Shelat et al. | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,739,411 B2 * | 6/2010 | Messer | H04L 67/1095 709/201 |
| 7,774,412 B1 | 8/2010 | Schnepel | |
| 7,814,426 B2 | 10/2010 | Huesken et al. | |
| 7,886,287 B1 | 2/2011 | Davda | |
| 7,886,295 B2 | 2/2011 | Burger et al. | |
| 7,890,964 B2 | 2/2011 | Vogler-Ivashchanka et al. | |
| 7,937,663 B2 | 5/2011 | Parker et al. | |
| 7,958,353 B2 | 6/2011 | Matsuzaki et al. | |
| 7,958,453 B1 | 6/2011 | Taing | |
| 7,979,296 B2 | 7/2011 | Kruse et al. | |
| 8,027,976 B1 | 9/2011 | Ding et al. | |
| RE42,904 E | 11/2011 | Stephens, Jr. | |
| 8,090,361 B2 | 1/2012 | Hagan | |
| 8,103,662 B2 | 1/2012 | Eagan et al. | |
| 8,117,261 B2 | 2/2012 | Briere et al. | |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,200,582 B1 | 6/2012 | Zhu | |
| 8,201,230 B2 | 6/2012 | Day et al. | |
| 8,214,747 B1 | 7/2012 | Yankovich et al. | |
| 8,230,348 B2 | 7/2012 | Peters et al. | |
| 8,239,918 B1 | 8/2012 | Cohen | |
| 8,326,814 B2 | 12/2012 | Ghods et al. | |
| 8,347,276 B2 | 1/2013 | Schadow | |
| 8,358,701 B2 | 1/2013 | Chou et al. | |
| 8,370,803 B1 | 2/2013 | Holler et al. | |
| 8,429,540 B1 | 4/2013 | Yankovich et al. | |
| 8,447,820 B1 | 5/2013 | Gay | |
| 8,464,161 B2 | 6/2013 | Giles et al. | |
| 8,473,775 B1 | 6/2013 | Helmick et al. | |
| 8,515,902 B2 | 8/2013 | Savage | |
| 8,527,549 B2 | 9/2013 | Cidon | |
| 8,549,066 B1 | 10/2013 | Donahue et al. | |
| 8,549,511 B2 | 10/2013 | Seki et al. | |
| 8,582,777 B2 | 11/2013 | Urivskiy et al. | |
| 8,583,619 B2 | 11/2013 | Ghods et al. | |
| 8,607,306 B1 | 12/2013 | Bridge et al. | |
| 8,650,498 B1 | 2/2014 | Mihovilovic | |
| 8,719,445 B2 | 5/2014 | Ko | |
| 8,719,810 B2 | 5/2014 | Oh | |
| 8,745,267 B2 | 6/2014 | Luecke et al. | |
| 8,782,637 B2 | 7/2014 | Khalid | |
| 8,825,597 B1 | 9/2014 | Houston et al. | |
| 8,849,955 B2 | 9/2014 | Prahlad et al. | |
| 8,868,574 B2 | 10/2014 | Kiang et al. | |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,939 B2 | 2/2015 | Peddada | |
| 8,959,579 B2 | 2/2015 | Barton et al. | |
| 8,966,062 B1 | 2/2015 | Giese et al. | |
| 8,990,307 B2 | 3/2015 | Barreto et al. | |
| 8,990,955 B2 | 3/2015 | Hymel et al. | |
| 9,015,248 B2 | 4/2015 | Barreto et al. | |
| 9,054,919 B2 | 6/2015 | Kiang et al. | |
| 2001/0027492 A1 | 10/2001 | Gupta | |
| 2002/0029218 A1 | 3/2002 | Bentley et al. | |
| 2002/0091738 A1 | 7/2002 | Rohrabaugh et al. | |
| 2002/0099772 A1 | 7/2002 | Deshpande et al. | |
| 2002/0116544 A1 | 8/2002 | Barnard et al. | |
| 2002/0133509 A1 | 9/2002 | Johnston et al. | |
| 2002/0147770 A1 | 10/2002 | Tang | |
| 2002/0194177 A1 * | 12/2002 | Sherman et al. | 707/8 |
| 2003/0041095 A1 | 2/2003 | Konda et al. | |
| 2003/0084306 A1 | 5/2003 | Abburi et al. | |
| 2003/0093404 A1 | 5/2003 | Bader et al. | |
| 2003/0108052 A1 | 6/2003 | Inoue et al. | |
| 2003/0110264 A1 | 6/2003 | Whidby et al. | |
| 2003/0115326 A1 | 6/2003 | Verma et al. | |
| 2003/0135536 A1 | 7/2003 | Lyons | |
| 2003/0135565 A1 | 7/2003 | Estrada | |
| 2003/0154306 A1 | 8/2003 | Perry | |
| 2003/0204490 A1 | 10/2003 | Kasriel | |
| 2003/0217171 A1 | 11/2003 | Von Stuermer et al. | |

(56) References Cited

U.S. PATENT DOCUMENTS

| | | |
|---|---|---|
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1* | 5/2007 | Beedubail et al. ............... 707/9 |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0179993 A1 | 8/2007 | Arruza |
| 2007/0198609 A1 | 8/2007 | Black et al. |
| 2007/0208878 A1 | 9/2007 | Barnes-Leon et al. |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1* | 12/2007 | Kiilerich et al. ............... 707/10 |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |

(56) References Cited

U.S. PATENT DOCUMENTS

| | | |
|---|---|---|
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082534 A1 | 4/2010 | Sagar et al. |
| 2010/0082634 A1* | 4/2010 | Leban .......................... 707/741 |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |

(56) References Cited

U.S. PATENT DOCUMENTS

| | | |
|---|---|---|
| 2012/0101995 A1 | 4/2012 | Agetsuma et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1* | 10/2012 | Cho et al. ............... 370/350 |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1* | 12/2012 | Jensen ..................... 709/248 |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0304694 A1 | 11/2013 | Barreto et al. |
| 2013/0305039 A1 | 11/2013 | Gauda |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |
| 2014/0047509 A1 | 2/2014 | Bhogal et al. |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0244600 A1 | 8/2014 | Schmidt et al. |
| 2014/0280605 A1 | 9/2014 | Zhang |
| 2014/0337291 A1 | 11/2014 | Dorman et al. |
| 2014/0337491 A1 | 11/2014 | Barreto et al. |
| 2014/0344456 A1 | 11/2014 | Buzbee et al. |
| 2014/0359286 A1 | 12/2014 | Wen et al. |
| 2014/0372376 A1 | 12/2014 | Smith et al. |
| 2014/0379647 A1 | 12/2014 | Smith et al. |
| 2015/0019723 A1 | 1/2015 | Kweon et al. |
| 2015/0039556 A1 | 2/2015 | Mackenzie et al. |
| 2015/0186668 A1 | 7/2015 | Whaley et al. |
| 2015/0237406 A1 | 8/2015 | Ochoa et al. |
| 2016/0065672 A1 | 3/2016 | Savage et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |

(56) References Cited

FOREIGN PATENT DOCUMENTS

| | | |
|---|---|---|
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"Conceptboard", One-Step Solution for Online Collaboration, retrieved from websites http://conceptboard.com and https://www.youtube.com/user/ConceptboardApp?feature=watch, printed on Jun. 13, 2013. 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 23, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback. Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wkipedia, Mar. 20, 2009, pp. 1-6.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for EP13185269.1, Applicant: Box, Inc. Mailed Jan. 28, 7 pages.
Exam Report for GB1309209.3, Applicant: Box, Inc. Mailed Oct. 30, 2013, 11 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.

(56) References Cited

OTHER PUBLICATIONS

Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1312264.3, Applicant: Box, Inc. Mailed Mar. 24, 2014, 7 pages.
Exam Report for GB1318792.7, Applicant: Box, Inc. Mailed May 22, 2014, 2 pages.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al. "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 13189144.2 Applicant: Box, Inc. Mailed Sep. 1, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Sommerer, "Presentable Document Format: Improved On-demand PDF to HTML Conversion," retrieved from the internet, http://research.microsoft.com, Nov. 2004, 8 pages.

Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1314771.5, Applicant: Box, Inc. Mailed Feb. 17, 2014, 7 pages.
Search Report for EP 11729851.3, Applicant: Box, Inc. Mailed Feb. 7, 2014, 9 pages.
User's Guide for SMART Board Software for Windows, published Dec. 2004, 90 pages.
Zambonini et al., "Automated Measuring of interaction with User interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
Exam Report for GB1311459.0 Applicant: Box, Inc. Mailed Aug. 19, 2013, 6 pages.

(56) References Cited

OTHER PUBLICATIONS

Exam Report for GB1220644.7 Applicant: Box, Inc. Mailed May 1, 2015, 4 pages.
Exam Report for GB1413461.3; Applicant: Box, Inc. Mailed Aug. 21, 2015, 6 pages.
Fu et al., Efficient and Fine-Grained Sharing of Encrypted Files, Quality of Service (IWQos), 2010 18th International Workshop on year 2010, pp. 1-2.
"Dropbox: Sync only specific folders," posted on Feb. 9, 2012, available online at http://www.tech-recipes.com/rx/20865/dropbox-sync-only-specific-folders/, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.
U.S. Appl. No. 13/526,437, filed Jun. 18, 2012 Managing Updates at Clients Used by a User to Access a Cloud-Based Collaboration Service.
U.S. Appl. No. 14/658,423, filed Mar. 16, 2015 Managing Updates at Clients Used by a User to Access a Cloud-Based Collaboration Service.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/622,868, filed Apr. 11, 2012 Web and Desktop Client Synchronization of Mac Packages with a Cloud-Based Platform.
U.S. Appl. No. 13/618,993, filed Sep. 14, 2012 Cloud Service Enabled to Handle a Set of Files Depicted to a User as a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System Monitoring in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.
U.S. Appl. No. 41/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to be Ignored for Synchronization with a Cloud-Based Platform by a Synchronization Client.
U.S. Appl. No. 14/275,890, filed May 13, 2014 Identification and Handling of Items to be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud- Based Platform.
U.S. Appl. No. 14/304,038, Jun. 13, 2014 Systems and Methods for Synchronization Event Building and/or Collapsing by a Synchronization Component of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 2, 2013 Corporate User Discovery and Identification of Recommended Collaborators in a Cloud Platform.

(56) References Cited

OTHER PUBLICATIONS

U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.
U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/710,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.

\* cited by examiner

350

| Synchronization Table for Moving a Folder (Except to Root) | | Destination Folder (DF) Original State | | |
|---|---|---|---|---|
| | | Sync (S) | Partially Sync (PS) | UnSync (US) |
| Moving Folder (MF) Original State | Sync (S) | MF: S | MF: S | MF: S |
| | | DF: S | DF: PS | DF: PS |
| | Partially Sync (PS) | MF: S | MF: PS | MF: PS |
| | | DF: S | DF: PS | DF: PS |
| | UnSync (US) | MF: S | MF: US | MF: US |
| | | DF: S | DF: US | DF: US |

| Folder | User | Path ID | |
|---|---|---|---|
| B | A01 | A | 361 |
| F | A02 | A/B/E | 362 |
| F | A03 | B/E | 363 |
| C | A01 | A | 364 |
| C | A02 | | 365 |

*FIG. 3D*

SERVER SIDE TECHNIQUES FOR REDUCING DATABASE WORKLOAD IN IMPLEMENTING SELECTIVE SUBFOLDER SYNCHRONIZATION IN A CLOUD-BASED ENVIRONMENT

CROSS-REFERENCE TO RELATED APPLICATIONS

This application claims the benefit of and/or the right of priority to U.S. Provisional Application No. 61/693,521, entitled "BACKEND IMPLEMENTATION OF SYNCHRONIZATION CLIENT SELECTIVE SUBFOLDER SYNCING IN A CLOUD-BASED ENVIRONMENT", filed Aug. 27, 2012, which is hereby incorporated by reference in its entirety.

This application is related to Great Britain Patent Application No. 1306177.5, entitled "METHOD AND APPARATUS FOR SELECTIVE SUBFOLDER SYNCHRONIZATION IN A CLOUD-BASED ENVIRONMENT", filed Apr. 5, 2013, which claims priority to U.S. Utility patent application Ser. No. 13/856,607, entitled "METHOD AND APPARATUS FOR SELECTIVE SUBFOLDER SYNCHRONIZATION IN A CLOUD-BASED ENVIRONMENT", filed Apr. 4, 2013, which is entitled to the benefit of and/or the right of priority to U.S. Provisional Application No. 61/620,568, entitled "SYNCHRONIZATION CLIENT SELECTIVE SUBFOLDER SYNCING IN A CLOUD-BASED ENVIRONMENT", filed Apr. 5, 2012; all of which are hereby incorporated by reference in their entireties.

BACKGROUND

With the advancements in digital technologies, data proliferation and the ever increasing mobility of user platforms have created enormous amounts of information traffic over mobile and computer networks. This is particularly relevant with the increase of electronic and digital content being used in social settings or shared environments of digital content compared to traditional stand-alone personal computers and mobile devices. As a result, content is shared across multiple devices among multiple users.

However, to date, content sharing and content synchronization lacks an intuitive manner in which content or folders/files in a shared space among multiple users can be accessed and/or synchronized in a user friendly manner. Further, the amount of data that servers have to process in order to coordinate the synchronization statuses for folders among multiple users can increase dramatically with the increasingly large amount of folders and users involved in a shared space.

BRIEF DESCRIPTION OF DRAWINGS

The present embodiments are illustrated by way of example and are not intended to be limited by the figures of the accompanying drawings. In the drawings:

FIG. 3C depicts a table illustrating example synchronization states for moving a subfolder to a destination folder;

FIG. 3D depicts an abstract example of a database with entries configured to identify hierarchical relationships between folders shared among the user and the collaborators on a per-user basis;

The same reference numbers and any acronyms identify elements or acts with the same or similar structure or functionality throughout the drawings and specification for ease of understanding and convenience.

DETAILED DESCRIPTION

Figure 1:
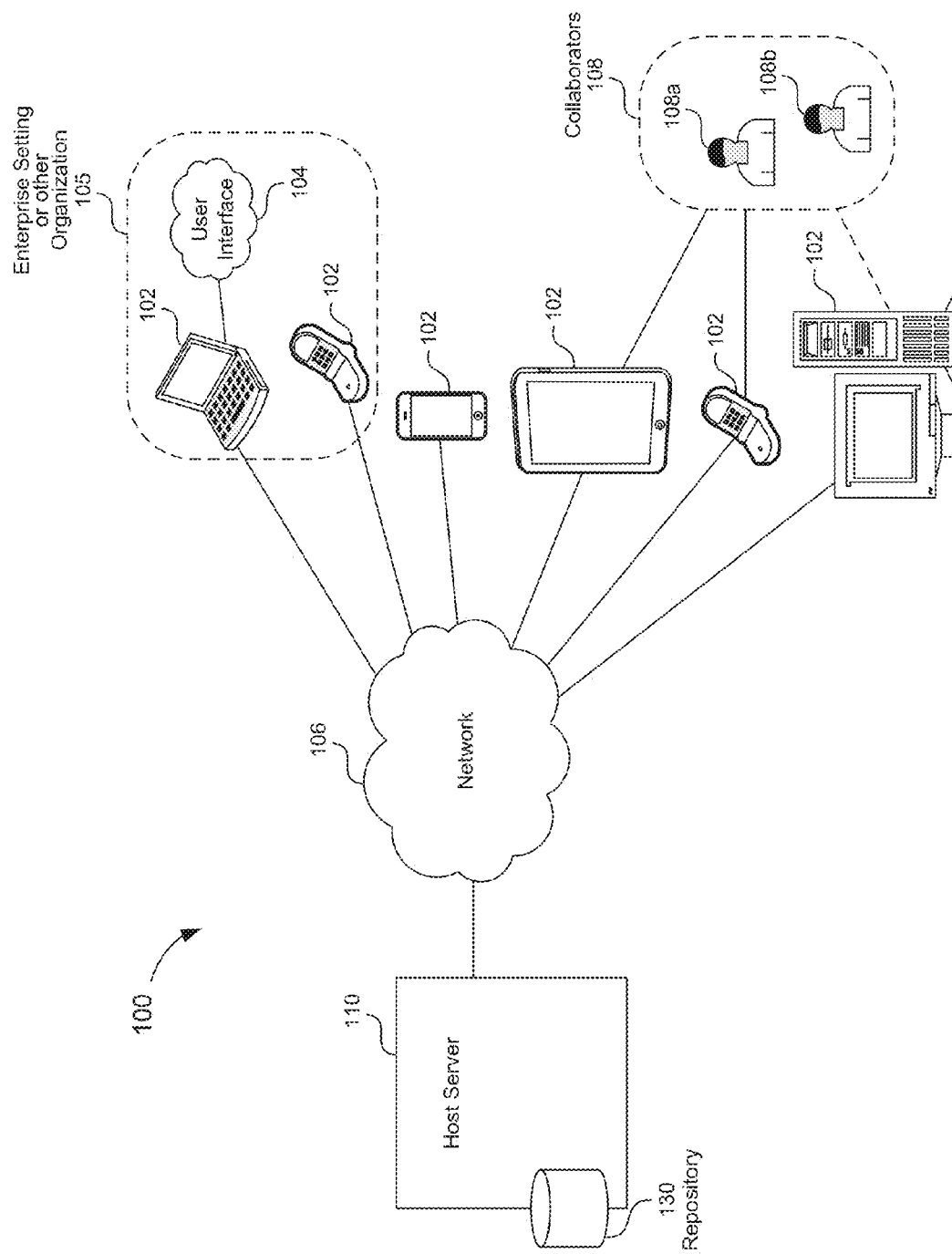
FIG. 1 depicts an example diagram of a system having a host server of a cloud service, collaboration and/or cloud storage accounts with capabilities that enable selective subfolder synchronization in a cloud-based environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Techniques are disclosed for reducing database workload in implementing selective subfolder synchronization in a cloud-based environment. In one embodiment, a method comprises, in response to a selection, from a user, of a first synchronization state of a first folder in the workspace, synchronizing content of the first folder in the workspace with a corresponding folder on devices of a user (and collaborators) based on the first synchronization state. The workspace is shared among the user and one or more collaborators of the user. In some embodiments, the method further comprises determining the first synchronization state of the first folder based on synchronization states of one or more folders, other than the first folder, that are related to the first folder. The entries can be configured to identify hierarchical relationships between the one or more folders and the first folder on a per-user basis.

Among other advantages, embodiments disclosed herein provide the ability, for each person of a user and his or her collaborators, to select only the desired folder(s), subfolder(s), or file(s) in their commonly shared workspace to be synchronized on one or more devices of theirs. Additionally, embodiments disclosed herein enable a database structure that reduces the amount of data that needs to be stored and processed in the database, thereby increasing the database efficiency, reducing the storage and processing power requirements of the database, and decreasing the cost in implementing selective subfolder synchronization in a cloud-based collaboration environment.

FIG. 1A illustrates an example diagram of a system 100 having a host server 110 of a cloud service/platform, collaboration and/or cloud storage service with capabilities that enable selective subfolder synchronization in a cloud-based environment.

The client devices 102 can be any system and/or device, and/or any combination of devices/systems that is able to establish a connection, including wired, wireless, cellular connections with another device, a server and/or other systems such as host server 110. Client devices 102 typically include a display and/or other output functionalities to present information and data exchanged between among the devices 102, and/or the host server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 110 are coupled via a network 106. In some embodiments, the devices 102 and host server 110 can be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 110). The collaboration environment or platform can have one or more collective settings 105 for an enterprise or an organization that the users belong, and can provide an user interface 104 for the users to access such platform under the settings 105.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user can be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace can be the same or can vary among the users. Each user can have their own set of access rights to every piece of content in the workspace, or each user can be different access rights to different pieces of content. Access rights can be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 110 communicate can be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and can appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The embodiments disclosed herein recognize that, with the growing prevalence of the communication networks (e.g., the Internet) and smart portable devices (e.g., smart phones), there are many instances when a user want to selectively synchronize one or more subfolders in a workspace that is associated with the user, and especially when the workspace is shared among one or more collaborators of the user. Also, the user can have more than one user devices that are capable of connecting to the workspace, and sometimes not all data in the workspace are desirable or necessary to be shared to all devices because of nature of data (e.g., confidentiality, sensitivity, and/or necessity), physical constraints of a particular device (e.g., screen size, computing power, or storage and/or network limitations), or for other applicable reasons.

In particular, in a large institute setting (e.g., an international corporation) where potentially very large folders with a high volume of files and data are shared among users and collaborators, it is desirable to have the capability for a user (and each of the collaborators) to select only the content (e.g., subfolders or files) that he or she may be interested for synchronizing with one or more computing devices (e.g., a smart phone or a laptop computer) of his or hers, while leaving the remainder of the content stored in the cloud-based collaboration platform (e.g., a workspace hosted by the host server 110).

Accordingly, embodiments of the present disclosure provide systems and methods that enable selective subfolder synchronization in a cloud-based environment/platform/services (e.g., collaboration, file sharing, and/or storage services) so that a user of the cloud-based environment can select individual folders for synchronizing according to his/her own preference. The advantages provided by the techniques disclosed herein are particularly beneficial when a large number of files are stored in the workspace, because each person of a user and his or her collaborators, can select only the desired folder(s), subfolder(s), or file(s) in their commonly shared workspace to be synchronized on one or more devices of theirs.

In accordance with some embodiments, the host server 110 can selectively synchronize one or more subfolders in the workspace with a synchronization client (e.g., on the client device 102). Specifically, the host server 110 can synchronize, in response to a selection of a first synchronization state of a first folder in the workspace from a user (e.g., of a client device 102), content of a first folder associated with the user based on the first synchronization state regardless of a second synchronization state of a second folder in the workspace. The first folder is a subfolder of the second folder. For example, the host server 110 can selectively synchronize a folder and block synchronization for one or more subfolders within the synchronized folder. For purposes of discussion herein, a workspace of a cloud-based environment, which is hosted by the host server 110, is shared among the user and one or more collaborators of the user.

In one embodiment, the host server 110 also communicates relevant details to the synchronization client on the client devices 102 for selective synchronization, and the synchronization client can selectively synchronize one or more subfolders in the workspace with the host server 110. Specifically, in some embodiments, the synchronization client can receive from the host server 110 the user's selection for the first synchronization state of the first folder in the workspace. In response to the received selection, the synchronization client synchronizes content of the first folder associated with the user based on the first synchronization state regardless of a second synchronization state of a second folder in the workspace.

Further, in some embodiments, the user can select a folder that is stored on the client to be synchronized with the host server 110. The synchronization client can receive, at the synchronization client on the client device 102, the user's selection of a synchronization state of a folder on the client. In response to the selection, the synchronization client synchronizes content of the folder on the client with the workspace based on the selected synchronization state regardless of another synchronization state of another folder. The folder is a subfolder of the another folder.

In addition, the present embodiments also recognize that the amount of data that the host server 110 has to process in order to coordinate the synchronization statuses for all the folders among multiple users can increase dramatically with the increasingly large amount of folders and users involved in a shared space. This can quickly overload the storage and computing power the host server 110 in implementing the selective subfolder synchronization in certain situations, for example, when large amount of collaborators are subscribed to a folder that contains all the subfolders or files for all the users Accordingly, in some embodiments, the host server 110 can employ a database structure (e.g., in the data repository 130) that reduces the amount of data that needs to be stored and processed in the database in implementing selective subfolder synchronization in a cloud-based collaboration environment. In accordance with one or more embodiments, the host server 110 can determine the first synchronization state of the first folder based on synchronization states of one or more folders, other than the first folder, that are related to the first folder. The determination can be performed on a per-user basis. In some implementations, the entries are configured to identify hierarchical relationships between the one or more folders and the first folder, so that a number of entries in the database can be less than a total number of folders that are related to the first folder.

More implementation details on the host server 110, the synchronization client, the workspace, the files and folders stored therein, and the relationship between the user and the collaborators are discussed below.

Figure 2:
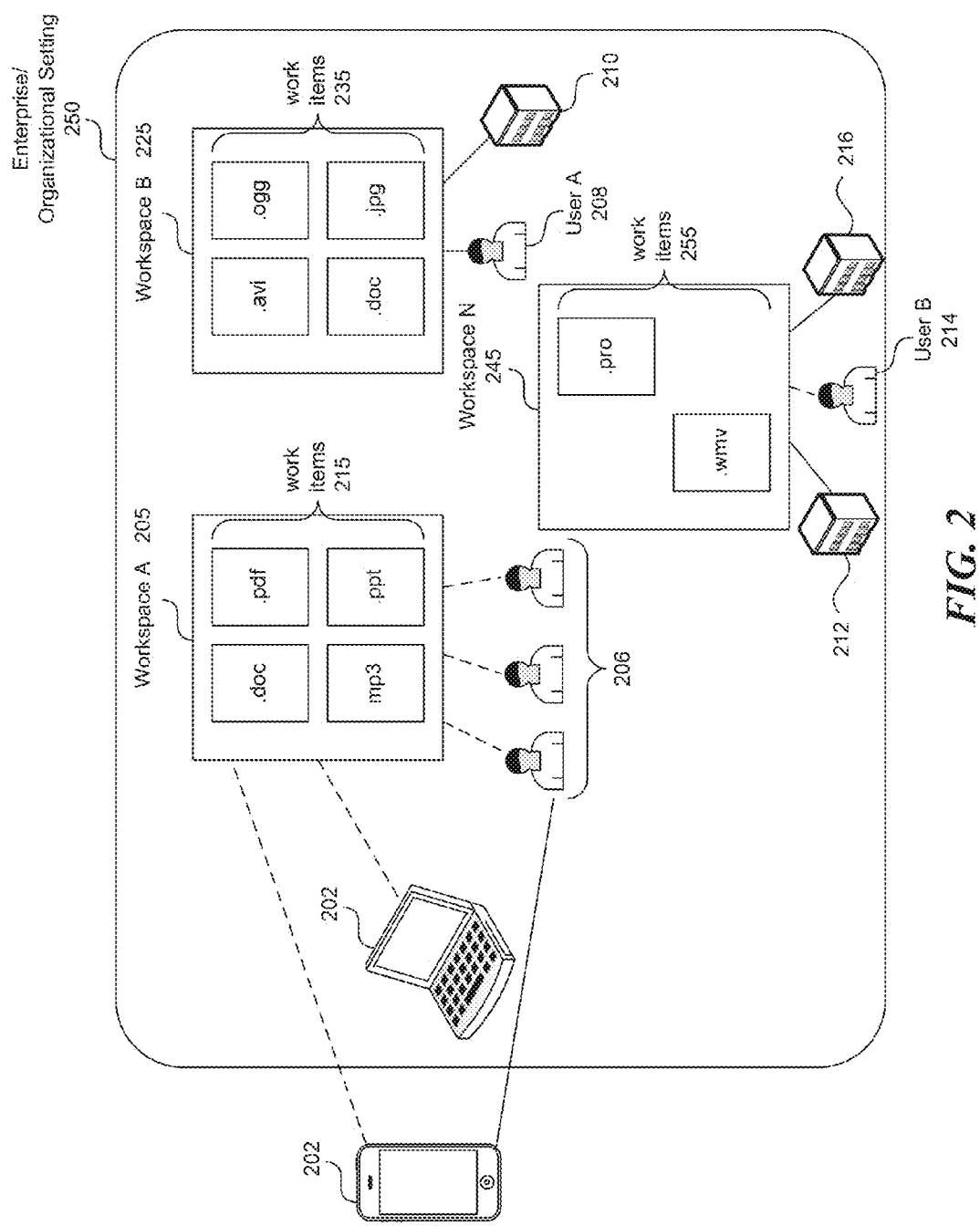
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
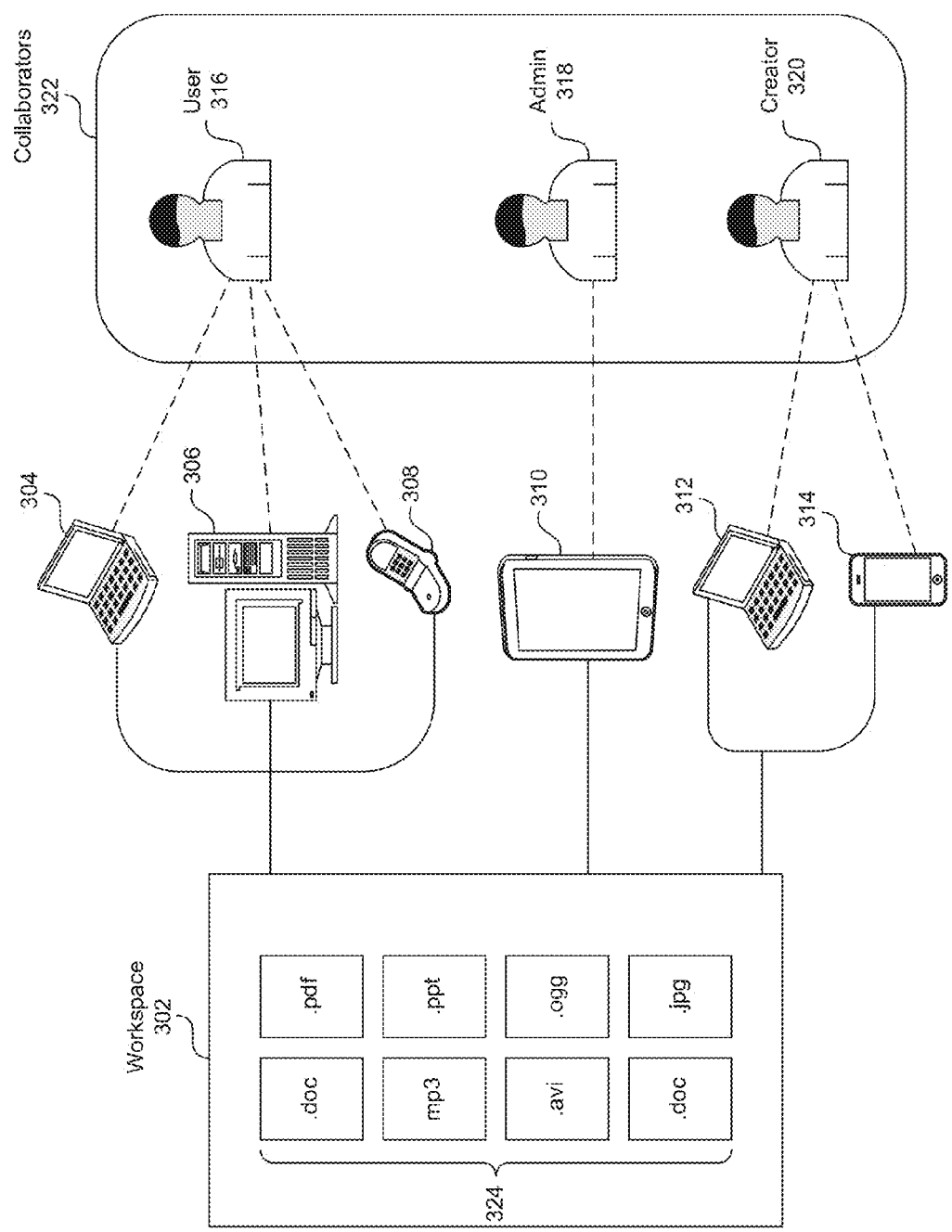
FIG. 3A depicts an example diagram of a workspace in an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
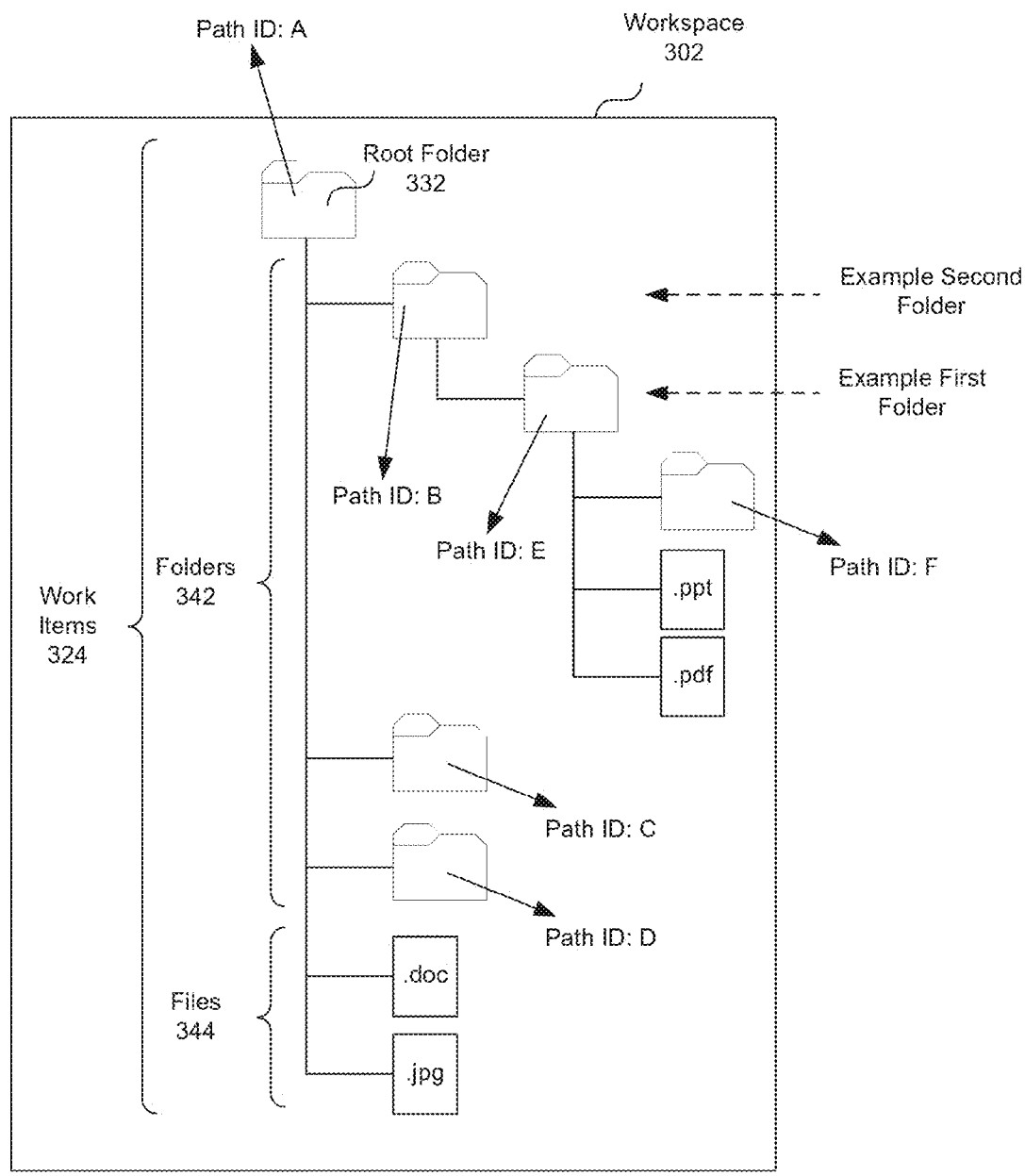
FIG. 3B depicts an abstract diagram illustrating an example hierarchy of the folders in the workspace of FIG. 3A.

FIG. 3B depicts an abstract diagram illustrating an example hierarchy of the folders in the workspace 302 of FIG. 3A. The techniques disclosed herein are now discussed with simultaneous reference to FIGS. 1 and 3A-3B.

Work items 324 of FIG. 3A can be further organized into groups using one or more folders 342 within workspace 302. The folders 342 can have more than one levels of hierarchy including, for example, parent/ascendant folder(s), child/decedent folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. An example of first and second folders is illustrated on FIG. 3B, where the first folder is a subfolder of the second folder. It is noted that the illustration of the two folders are merely exemplary; depending on the embodiments, there can be more than one level of hierarchy (e.g., the first folder is a grandchild folder of the second folder) between the first and the second folders, and that the second folder can be the root folder 332.

In accordance with some embodiments, the host server 110 provides the capability of selectively synchronizing an individual subfolder (e.g., a first folder in folders 342) in addition to synchronizing everything that is included in the entire the root folder 332. Additionally, the host server 110 can selectively block the first folder from being synchronized, even when the first folder is within a parent folder (e.g., a second folder) that is synchronized. More specifically, the host server 110 can synchronize, in response to a selection of a first synchronization state of the first folder in the workspace 302, content of the first folder associated with the user based on the first synchronization state regardless of a second synchronization state of a second folder in the workspace 302, even if the first folder is a subfolder of the second folder. The user's selection can be received from the user via the user interface 104 (e.g., in forms of webpages) of the host server 110, via a synchronization client running on the client devices 102, or via any other suitable sources. In some embodiments, the host server 110 synchronizes, in response to the selection, content of other folders in the workspace 302 based on their respective synchronization states. For purposes of discussion herein, "content" of a respective folder (e.g., a root folder 332 of the workspace 302) refers to files (e.g., files 344) stored in the respective folder. According to some embodiments, all the files 344 or content in the respective folder have same synchronization states as the respective folder, and subfolders (e.g., folders 342) within the respective folder each has its independent synchronization state.

It is noted that the terms "user" and "collaborator" are used in a relative sense. For example, a user 316 can be whoever that is currently performing operations on the workspace, and those who are sharing the same workspace are the user's collaborators 322, which can include the user 316 himself or herself.

In one or more embodiments, in addition to synchronizing content of the first folder in the workspace 302 with a corresponding folder on a device (e.g., devices 304-314) of a user (e.g., creator 320) based on the first synchronization state, the host server 110 also synchronizes content of the first folder in the workspace 302 with a corresponding folder on a device of a respective collaborator (e.g., another user) based on the first synchronization state. More specifically, the host server 110 can respond to a user's selection of the first synchronization state of the first folder, and synchronize accordingly content of the first folder on devices of the user and the collaborators based on the selection. This can be particularly useful when the folder being shared is owned by the user (e.g., creator 320 or administrator 318), and therefore the collaborators (e.g., a regular user 316) who are sharing the folder have lesser control privilege over the owner user. The technique can be complementary to the techniques discussed above, and is not mutually exclusive to the technique of allowing each of a user and his or her collaborators to selectively choose which content (e.g., folders, subfolders, or files) in the workspace that he or she desires to synchronize with his or her devices (e.g., smart phones, computers, etc).

In some embodiments, the host server 110 determines the first synchronization state of the first folder before the host server 110 synchronizes the first folder with the synchronization client(s). The first synchronization state can include one or more of: (i) synchronized, (ii) partially synchronized, or (iii) unsynchronized. Specifically, in one or more embodiments, the host server 110 assigns the first synchronization state as synchronized if the content of the first folder and all its subfolders are all synchronized. The host server 110 can assign the first synchronization state as unsynchronized if the content of the first folder and the subfolders are all unsynchronized, and can further assign the first synchronization state as partially synchronized if the content of the first folder and the subfolders are neither all synchronized nor all unsynchronized.

One or more embodiments provide that the host server 110 allows (e.g., by providing options or checkboxes to the user via the user interface 104) the user to select the first synchronization state based on an original synchronization state of the first folder. For example, if the original synchronization state is synchronized, then the host server 110 allows the user to disable the first synchronization state to unsynchronized. If the original synchronization state is partially synchronized, then the host server 110 allows the user to either enable the first synchronization state to synchronized or to disable the first synchronization state to unsynchronized. If the original synchronization state is unsynchronized, then the host server 110 allows the user to enable the first synchronization state to synchronized.

Further, after receiving the user's selection, the host server 110 can automatically assign synchronization states to the first folder and/or other folders in workspace 302 based on the user's selection. Specifically, in some embodiments, if the user enables the first synchronization state, then the host server 110 assigns synchronization states of all subfolders of the first folder as synchronized. If the user disables the first synchronization state, then the host server 110 assigns synchronization states of all subfolders of the first folder as unsynchronized.

Additionally, in response to the user's selection, the host server 110 can automatically update the synchronization state of the second folder, of which the first folder is a subfolder. For example, if all subfolders of the second folder are synchronized, then the host server 110 assigns the second synchronization state as synchronized. If all subfolders of the second folder are unsynchronized, then the host server 110 assigns the second synchronization state as unsynchronized. In response to the selection, if not all subfolders of the second folder are all synchronized or all unsynchronized, then the host server 110 assigns the second synchronization state as partially synchronized. In some embodiments, the update is recursively performed by the server 110 to all folders related to the first folder, including ascendant and/or decedent folders.

In accordance with some embodiments disclosed herein, the user can select to create the first folder in the workspace 302 if it does not exist. When the first folder is created, the host server 302 can automatically assign the first synchronization state to the first folder based on the second folder's synchronization. If the second synchronization state is synchronized, then the host server 110 assigns the first synchronization state as synchronized. If the second synchronization state is not synchronized (e.g., unsynchronized or partially synchronized), then the host server 110 assigns the first synchronization state as unsynchronized. It is noted that, in some embodiments, the server 110's operations of copying a folder is similar to that of creating a folder. Specifically, the original first synchronization state is ignored by the host server 110, and the host server 110 assigns a new synchronization state to the newly created folder based on the synchronization state of the parent folder of the newly created folder.

In another additional or alternative embodiment, the user can select to move the first folder (e.g., a moving folder) in the workspace 302 into another folder (e.g., a destination folder) in the workspace 302. The another folder can be any folder in the workspace 302 including the folders 342 and the root folder 332. According to some implementations, upon moving, the host server 110 can update the first synchronization state based on the synchronization state of the another folder. In one embodiment, the host server 110 assigns the first synchronization state as synchronized if the synchronization state of the another folder is synchronized. In addition, the host server 110 maintains the first synchronization state as is if the third synchronization state is not synchronized (e.g., unsynchronized or partially synchronized).

In yet another embodiment, if the synchronization state of another folder originally is unsynchronized, and if the first synchronization state originally is not unsynchronized, the host server 110 assigns the synchronization state of another folder as partially synchronized. If the another folder is the root directory 332 of the workspace 302, the host server can 110 maintain the first synchronization state as is. A table 350 which illustrates example synchronization states for moving the first folder to the destination folder is depicted in FIG. 3C.

According to some embodiments, all files or content (e.g., files 344) in the root directory 332 of the workspace 302 have synchronization states as synchronized, and the synchronization state of the root directory 332 is permanently set as partially synchronized.

Moreover, the host server 110 can display, on the user interface 102 of the server, an icon for a respective folder that distinctively indicates a synchronization state of the respective folder. For example, the host server 110 can use a first image for the state of the respective folder being synchronized, another image for the state of the respective folder being partially synchronized, and yet another image for the state of the respective folder being unsynchronized.

As previously mentioned, the host server 110 synchronizes the content of the first folder in the workspace 302 with a synchronization client on client devices 102; the term "synchronization client" can refer to software, hardware, firmware, or any suitable combination thereof that can communicate with the host server 110 in performing the synchronization. Accordingly, in some embodiments, the client (e.g., client devices 102) can receive from the host server 110 a selection from the user for the first synchronization state of the first folder in the workspace 302, and, in response to the received selection, the client synchronizes content of the first folder associated with the user based on the first synchronization state regardless of a second synchronization state of a second folder in the workspace 302. In response to the received selection, the client can additionally synchronize content of other folders in the workspace 302 with data stored on the client based on their respective synchronization states.

The synchronization client can further maintain, on the client, a directory tree that corresponds to a directory structure of the first folder. The directory tree on the client includes all folders having a higher hierarchy above the first folder. For example, if there is a folder named "Alpha" under the root folder 332 in the workspace 302, and inside that "Alpha" folder is a subfolder named "Beta." Even if the user only enables the synchronization state for "Beta" but not for "Alpha," then the directory structure of the Beta folder on the client can still be maintained as "Root/Alpha/Beta."

Furthermore, in some embodiments, if the user enables the first synchronization state and if a local folder that corresponds to the first folder in the workspace 302 does not exist on the client, the client can create the local folder on the client. Also, if (i) the user enables the first synchronization state and if the first folder is deleted in the workspace 302, or if (ii) the user disables the first synchronization state of the first folder, the client can delete the local folder that corresponds to the first folder from the local drive. For example, if a folder in the workspace 302 is disabled by the user from synchronization, the folder is to be removed locally, either immediately or at an appropriate time (e.g., when a next synchronization iteration is performed). Similarly, if a folder in the workspace 302 is enabled by the user for synchronization, it is to be added locally, either immediately or at an appropriate time (e.g., when the next synchronization iteration is performed).

Additionally or alternatively, the user can use the synchronization client to selectively synchronize one or more subfolders on the client with the host server 110. More precisely, the client can receive, at the client (e.g., client devices 102), a selection from the user for a synchronization state of a folder on the client, and in response to the selection, the client synchronizes content of the folder on the client with the workspace 302 based on the synchronization state of the folder regardless of a synchronization state of another folder. In some embodiments, the folder is a subfolder of the another folder. In response to the selection, the client can further synchronize content of other folders on the client with the workspace 302 based on their respective synchronization states.

Also, one or more embodiments provide that the client maintains a directory tree in the workspace 302 that corresponds to a directory structure of the folder on the client. Similar to a manner described above, the directory tree in the workspace can include all ascendant folders having a higher hierarchy above the folder on the client. Specifically, the client communicates to the host server 110 relevant information for the server 110 to perform actions suitable to synchronize, in the workspace 302, the content and the directory structure of the first folder.

For instance, if the user enables the synchronization state of the folder on the client and if the folder is deleted, the client can communicate to the host server 110 to delete a folder in the workspace 302 that corresponds to the first folder on the client.

For another instance, the client may, in response to the user creating the first folder, if a folder that corresponds to the first folder does not exist in the workspace 302, then the client requests the host server 110 to create the folder that corresponds to the first folder in the workspace 302 for synchronization. On the other hand, if the folder that corresponds to the first folder already exists in the workspace 302, then the client requests the host server 110 to create a conflicting folder in the workspace 302 for synchronization. In this way, risk of accidental overwriting data can be minimized.

FIG. 3D depicts an abstract example of a database 360 with synchronization entries 361-365 configured to identify hierarchical relationships between folders shared among the user and the collaborators on a per-user basis. The entries 361-365 are configured to identify a folder (that is synchronized), a user, and a string of path identifiers for that folder per the user. With reference to FIGS. 1, 3A-3B, and 3D, in some embodiments of the host server 110, a database structure can be employed (e.g., in the data repository 130 of the host server 110) that reduces the amount of data that needs to be stored and processed in the database in implementing selective subfolder synchronization in a cloud-based collaboration environment.

A typical but less desirable method for bookkeeping each folders synchronization states in a database in order to implement the selective subfolder synchronization techniques would be storing a row in the database for every single folder and subfolder (and potentially each file, if a file-level selective synchronization is to be implemented). However, because the collaborative nature of the cloud-based workspace 302, the amount of data that the host server 110 has to process in order to coordinate the synchronization statuses for all the folders among multiple users can increase dramatically with the increasingly large amount of folders and users involved in the workspace 302, This can quickly consume the storage and computing power the host server 110 in implementing the selective subfolder synchronization in certain situations, for example, when large amount of collaborators are subscribed to a folder that contains all the subfolders or files for all the users.

According to one or more embodiments, the host server 110 can determine the first synchronization state of the first folder based on synchronization states of one or more folders, other than the first folder, that are related to the first folder. The determination can be performed on a per-user basis. In some implementations, the entries are configured to identify hierarchical relationships between the one or more folders and the first folder, so that a number of entries in the database can be less than a total number of folders that are related to the first folder.

More specifically, because the workspace 302 are shared among a number of users/collaborators in a collaborative environment, in some embodiments, the database 130 is configured to include a path identifier (ID) data structure system (e.g., as illustrated in the example entries 361-366) so that a reduced amount of information can be stored in database 360. Information of synchronization states of other folders that are not recorded in the database 360 can be calculated or interpolated in ways that are discussed below.

In some embodiments, the host server 110 can determine a first synchronization state of a first folder based on synchronization states of one or more folders, other than the first folder, that are related to the first folder. For example, when the host server 110 needs to retrieve the synchronization state of a particular folder, and the entries (e.g., entries 361-365 in database 360) storing the synchronization states may not include the folder of interest, then the host server 110 can determine (e.g., by calculation, by interpolation, or by other suitable means) from the database 360 what the synchronization state of the particular folder of interest.

For one example, if a user 316 wants to synchronize an entire folder tree (e.g., root folder 332), because everything below the root folder 332 is also synchronized, then only such information at the uppermost level of that tree needs to be stored in the database 360. For another example, if a user 316 wants to synchronize only one folder (e.g., folder B) that has a number of sibling folders (e.g., Folder C, Folder D) in a tree, then the database 360 can mark just that one folder out of the set of siblings as synced. Conversely, if a user 316 wants to synchronize seven out of eight children folder in a folder tree, then the database 360 can mark all seven of those as synchronized, and can keep the one that is not synchronized out of the database 360 (e.g., so that it is regarded as not synchronized).

More specifically, the path ID column in the entries 361-365 are configured to identify the hierarchical relationship between the folders that are related to the particular folder of interest, so that the host server 110 can determine the location (and the synchronization status, whether synchronized, unsynchronized, or partially synchronized) of the folder of interest relative to other related folders in a particular user's account.

Take entry 361 as a specific example, for user A01, Folder B is synchronized, and its directorial path back to its parental folders is A; now, if the host server 110 needs to determine the synchronization state for Folder E for user A01, because for user A01, Folder E's parent Folder B is synchronized (as indicated by entry 361), the synchronization state for Folder E for user A01 is also synchronized.

The host server 110 can also calculate what folders are synchronized by using an identifier (e.g., a path ID) of a current folder and scanning the database 360 beneath the current folder to look for (in the entries) any folder that has the current folder in its path ID column. Then, the host server 110 can automatically determine that the folders found are descendants of the folder of interest, and can determine synchronization states for the folder of interest based on the scanning results. In some embodiments, the identifier of the folder of interest can be supplied from a client (e.g., running on device 304-314) of the user.

Take entry 362 as an example, for user A02, Folder F is synchronized, and its directorial path back to its parental folders is A/B/E; now, if the host server 110 needs to determine the synchronization state for Folder E for user A02, because for user A02, Folder E's parent Folder B's synchronization state is not yet recorded, but Folder E's only child Folder F is synchronized, the synchronization state for Folder E for user A02 is also synchronized. Contrarily, if not all Folder E's children folders are all synchronized, the synchronization state for Folder E for user A02 is partially synchronized. And, assuming all Folder E's children folders are unsynchronized, then the synchronization state for Folder E should be unsynchronized.

It is also noted that, in entry 363, for user A03, Folder F is synchronized; however, because user A03 does not have the privilege to collaborate on the root Folder A, the path ID for Folder F for user A03 is only B/E.

In this way, the techniques described above can effectively represent what is synchronized with a number of entries in the database 360 that is less than a total number of folders that are related to the first folder, resulting in having fewer entries in the database 360, which in turn decreases the time of queries the host server 110 has to send to the repository 130 in determining synchronization states of one or more folders of interest. After the host server 110 determines the synchronization state for a folder of interest, the host server 110 may include as a part of a response to the client(s) for synchronization purposes whether or not the folder of interest in synchronized, partially synchronized, or unsynchronized.

Additionally, because the collaboration nature of the workspace 302 (e.g., as being shared among different users), the database 360 can record the synchronization states on a per-user basis. By the same token, if an action takes place (e.g., move, delete, or uncollaboration) to one folder, the action may affect several different users (e.g., collaborators) that are participating in that folder, and the host server 110 together with the database 360 can make changes on corresponding folders on the user's and the collaborators' devices to appropriately reflect the action.

Therefore, in some embodiments, the host server 110 is configured to perform a "delete_sync( )" function to clean up the entries in the database 360 for users and collaborators after a synchronized folder is deleted. More specifically, if the folder deleted was the only synchronized subfolder of a parent folder, then the parent folder will become marked as files-only synchronized (e.g., or in some instances, partially synchronized). Moreover, if the folder synchronized deleted is the only subfolder of the parent, then the parent folder will no longer have any subfolders and will get marked as fully synchronized.

In some embodiments, the host server 110 is configured to perform a "delete_non_sync( )" function to clean up the entries in the database 360 for users and collaborators after a non-synchronized folder is deleted. More specifically, if the deleted folder had siblings that are all synced, then the parent folder will become marked as synchronized and the entries for (or item sync rows) the sibling folders will be deleted. Moreover, if the parent folder ends up becoming synchronized, the entry can "bubble further up the tree," or the synchronization state can populate to upper level folders, according to similar rules depending on the synchronization states of the parent folder's siblings.

In some embodiments, the host server 110 is configured to perform a "sync_folder( )" function to synchronize a folder for a given user, and to clean up the entries in the database 360 to reflect the newly selected synchronization state. More specifically, if the folder to be synchronized has siblings that are all already synchronized, then a synchronization entry will be added to the parent folder and the entries for the sibling folders will be removed. It is noted that the synchronization entry can again "bubble up the tree" according to similar rules. Moreover, any entries for descendants of the synchronized folder would have their synchronization entries deleted.

In some embodiments, the host server 110 is configured to perform a "unsync_folder( )" function to unsynchronize a folder for a given user, and to clean up the entries in the database 360 to reflect the newly selected synchronization state. More specifically, the host server 110 can delete any entries for the folder being unsynchronized and any that for its descendants. If the folder being unsynchronized has no siblings, then the parent folder will become marked as being "files only" synchronized (or in some instances, partially synchronized). If the folder being unsynchronized has sibling folders that are all synchronized, then the entries for the parent folder will be deleted, and entries for each of the siblings will be added.

In some embodiments, the host server 110 is configured to perform a "update_item_syncs_for_move( )" function to clean up the entries in the database 360 for all users at both the source and destination of a move operation. More specifically, if the folder being moved is unsynchronized at its original location and the parent folder of the destination is unsynchronized, then the moved folder will remain unsynchronized. Moreover, if destination parent is synchronized, then the folder will be synchronized in its new location. If the destination parent is partially synchronized, then the moved folder will retain its original synchronization state from the source location. If the destination parent is fully synchronized, then the moved folder will be fully synchronized in its new location. The synchronization entries for the parents of the source folder may get reshuffled according to same rules as the "delete_sync( )" function described above.

In some embodiments, the host server 110 is configured to perform a "uncollab( )" function to clean up the entries in the database 360 for a collaborator he or she becomes removed from a folder.

In some embodiments, the host server 110 is configured to perform a "lower_collab_permission( )" function to clean up the entries in the database 360 for a collaborator if his or her access permission changes so that the collaborator can no longer synchronize a folder.

In some embodiments, the host server 110 is configured to perform a "delete_user( )" function to remove the entries in the database 360 for a user who is deleted.

Further, in some embodiments, the host server 110 is configured to perform a "mark_update_timestamp_for_siblings( )" function to change an update timestamp on a folder after its synchronization state changes.

It is noted that, in implementing the functions aforementioned, the host server 110 can perform one or more of low level functions that are used to compose higher level subfolder synchronization functionalities. Examples of these low level functions are:

1. functions used to get information about a folder's parent folders (ancestors) or sibling folders, such as:

(a) get_parent_id—returns the folder id that is the parent of the specified folder.

(b) get_all_parent_ids—returns a list of folder ids that are ancestors of the specified folder.

(c) get_siblings—returns folders in the same folder as a specified folder.

(d) has_siblings—returns whether there are other folders in the same folder as a specified folder.

(e) get_sync_path—returns the path to a collaborated folder as seen from the collaborator's perspective.

2. functions used to get current sync state on one or more folders for one or more users, such as:

(a) get_sync_state—returns the current sync state for a specified folder for a specified user (ie. "synced", "unsynced", "partially synced").

(b) get_sibling_sync_state—returns the collective sync state of all the siblings of a specified folder for a specified user (ie. "non synced", "all fully synced", "all partially synced", "no siblings", "mixed sync status").

(c) get_sync_states_optimal—returns the sync states for a set of specified folders for a specified user.

(d) make_sync_state_array—returns a mapping of folder ids to current sync states for a list of specified folders for a specified user.

(e) get_sync_states_for_all_users—returns the sync states of a specific folder for all collaborating users individually.

3. functions used to determine the "edges" of where the database is storing sync information about a user's folder tree, such as:

(a) is_in_item_sync_table—determines if the database has an item sync row for a specific folder for a specific user.

(b) is_parent_in_item_sync_table—determines if the database has an item sync row for any ancestors (parents) of a specific folder for a specific user.

(c) is_self_or_descendants_in_item_sync_table—determines if the given folder or any children of that folder have database rows in the item sync table for a specified folder and user.

4. Functions used to fetch the "edges" of where the database is storing sync information about a user's folder tree, such as:

(a) get_item_syncs_at_or_below_folder_for_user—returns item sync rows found in the database at or below (inside) the specified folder for a specified user.

(b) get_all_syncs—returns all item sync rows in the database on folders that are ancestors or children of a specified folder for a specified user.

5. Functions used to change the sync states on a folder, it's children, or its siblings when various folder actions occur, such as:

(a) remove_sync_rows_down—removes all of the item sync rows in the database at or below a specified folder for a specified user.

(b) make_sync_rows_for_siblings—creates item sync rows in the database for all of the siblings of a specified folder for a specified user.

(c) delete_sync_rows_for_siblings—deletes any item sync rows in the database for all of the siblings of a specified folder for a specified user.

(d) add_sync_row—creates a sync row in the database for a specific folder for a specific user.

Additionally, the following example test cases are provided so as to serve as indicators for helping one of ordinary skill in the art verify whether the selective subfolder synchronization techniques are implemented as intend. However, a person having ordinary skill in the art will know that these test cases are merely exemplary, that they can be modified to suit different applications, and that they do not necessarily nor sufficiently guarantee the operations of the selective subfolder synchronization techniques disclosed herein.

Sync Tests:

test_basic_folder_synced()

This tests that the tree updates correctly of we mark a parent folder as synced. So for tree:

Where A and B are both initially unsynced, if we mark A as synced, A should be in the sync table (and B should still not be).
A = parent_folder, B = folder
test_basic_subfolder_synced()

This tests the basic subfolder sync scenario. So basically, it tests that the tree updates correctly of we have two unsynced folder and sync the subfolder. So for tree:

Where A and B are both initially unsynced, if we mark B as synced, A should be in the sync table (and B should still not be).
A = parent_folder, B = folder
test_last_subfolder_is_synced()

Tests that if the last unsynced subfolder is synced, the sync will appropriately propagate up the tree. So in this case, we have:

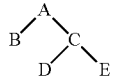

Where initially B and D are marked as synced (and A & C are implicitly synced) and then we mark E as synced, the table should change to have A marked as synced. In this test case,
A = parent_folder, B = other_child, C = mid_parent, D = original_two_level_down_sync → item() and E = unsynced_child.
test_subfolder_of_partially_synced_folder_synced()

This test tests that the tree updates correctly when the subfolder of a partially synced tree is synced.
So for tree:

Where A is partially synced and B & C are unsynced. If B is marked as synced, then A and C should not have sync rows, but B should have a fully synced row.
A = parent_folder, B = subfolder, C = second_subfolder Sync Tests:

test_only_subfolder_of_partially_synced_folder_synced()

This test tests that a tree updates correctly when the only subfolder of a partially synced folder is marked as synced. So for tree:

A
|
B

Where A is marked as files_only synced and B is unsynced, it we mark B is marked as synced, the sync rows should update to have A marked as synced.
A = parent_folder, B = subfolder
test_partially_synced_folder_is_synced()

This test tests that the tree updates correctly when a files_only synced folder is marked as fully synced. So for tree:

A
|
B

Sync Tests:

Where A is initially files_only synced, if A is marked as fully synced, the table should update so that there is a fully synced sync row for A (And B should still not be in the table.
A = parent_folder, B = subfolder
test_files_only_sync_goes_away_when_child_is_synced()

This tests that the tree gets rid of a parent files only sync when a child is marked as fully synced.
So for tree:

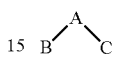
A
B   C

Where A is marked as files only synced and B and C are unsynced, if we mark B as fully synced, A should no longer have a partial sync row.
A = $this→parent_folder, B = $this→subfolder, C = $this→second_subfolder Unsync Tests:

test_unsync_folder_in_root_deletes_syncs()

Simple test that creating a root level synced folder and then unsyncing it leaves the user with no syncs in the item_sync table.
test_unsync_single_folder()

Starting with tree:
   A   Where A is synced
Unsyncing A →
No synced folders
test_subfolder_unsynced_updates_table_correctly()

Starting with tree:

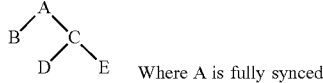
      A
  B   C
    D  E   Where A is fully synced

Unsyncing E =>
B synced, D synced,
A = $this→parent_folder, B = $this→other_child, C = $this→mid_parent
D = $this→original_two_level_down_child, E = $this→other_two_level_down_child
test_unsync_last_subfolder_updates_table_correctly()

Starting with tree:

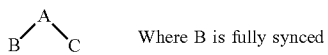
   A
B   C   Where B is fully synced

Unsyncing B =>
A files_only synced
A = $this→parent_folder, B = $this→subfolder, C = $this→second_subfolder
test_unsync_only_subfolder_updates_table_correctly()

Starting with tree:

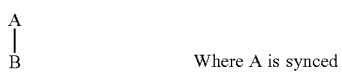
A
|
B         Where A is synced

Unsyncing B =>
A files only synced
A = $this→parent_folder, B = subfolder

-continued

| Unsync Tests: |
|---|
| test_unsync_partially_synced_folder_updates_table_correctly() |

Starting with tree:

A
|
B
|
C           Where B is files only synced

Unsyncing B =>
A files only synced
A = $this→Parent_folder, B = $this→mid_parent, C = $this→subfolder test_unsync_multi_layer_with_one_child_updates_table_correctly()

Starting with tree:

```
   A
  / \
 B   C
     |
     D
```
Where A is synced

Unsyncing D =>
C files only synced, B synced
A = $this→parent_folder, B = $this→sync_sibling, C = $this→mid_parent, D = $this→subfolder test_unsync_delete_top_level_updates_tree_correctly()

Starting with tree:

```
   A
  / \
 B   C
```
Where A is synced

No synced folders
A = $this→parent_folder, B = $this→subfolder, C = $this→second_subfolder test_unsync_on_mixed_children_causes_no_tree_changes()

Starting with tree:

```
    / A \
   /  |  \
  B  C D  E
```
Where C is files_only syned and D is fully synced Unsyncing C =>
D fully synced
A = $this→parent_folder, B = $this→unsynced_subfolder, C = $this→files_only_synced_subfolder,
D = $this→synced_subfolder, E = $this→second_unsynced_subfolder

| Delete Tests: |
|---|
| test_delete_folder_deletes_sync() |

This is a test to verify that all of the correct sync rows are deleted when a synced folder is deleted.
test_delete_folder_also_deletes_collab_and_child_syncs()

Test to see if when we delete a folder, it will also delete any sync rows on it (or its children) for any collaborators.
test_delete_folder_also_deletes_subfolder_syncs_for_owner_and_collab()

Test that item syncs are removed when deleting a collaborated folder containing a subfolder synced by an owner and collab.
test_delete_unsynced_sibling_folder_moves_item_sync_up_one_for_collaborator_and_up_two_for_owner()

Test that deleting a sibling of a synced folder in a collab moves the sync up the tree -continued Delete Tests:

Starting with tree:

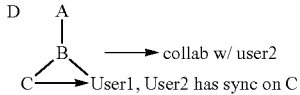
→ collab w/ user2
→ User1, User2 has sync on C user1 has sync1 on C, user2 has sync2 on C
Deleting D =>

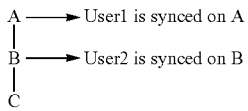
→ User1 is synced on A
→ User2 is synced on B test_delete_folder_for_last_synced_sub_folder_fixes_tree()

Starting with tree:

  Where B is synced.

Deleting C =>

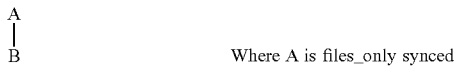  Where A is files_only synced test_delete_folder_only_subfolder_deleted_fixes_tree()

Starting with tree:

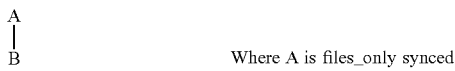  Where A is files_only synced

Deleting B =>
    A   Where A is synced
test_delete_folder_last_unsynced_subfolder_fixes_tree()

Starting with tree:

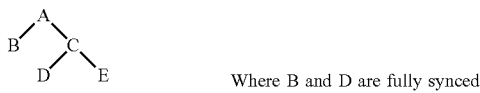  Where B and D are fully synced

Deleting E =>

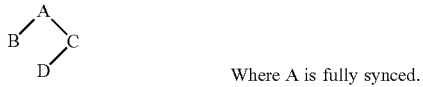  Where A is fully synced.

test_delete_files_only_synced_subfolder_ith_sync_sibling_fixes_tree()

Starting with tree:

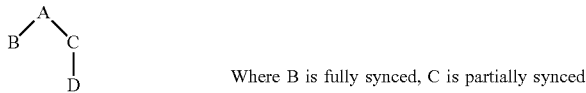  Where B is fully synced, C is partially synced

Deleting C =>

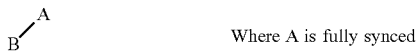  Where A is fully synced

-continued

Delete Tests:

test_delete_files_only_synced_subfolder_with_unsynced_sibling_fixes_tree()

Starting with tree:

    Where C is partially synced

Deleting C =>

    Where A is partially synced

Uncollaboration Tests:

test_uncollaborating_a_root_folder_removes_sync_for_collaborator()

Tests one root folder incollabed removes sync for collaborator
    A ← collabed, synced by user1,user2
A gets uncollabed:
    sync on A for user2 should disappear
    sync on A for user1 should remain
A = $this→folder test_uncollaborating_a_subfolder_removes_sync_for_collaborator()

Tests a sub-folder uncollabed removes sync for collaborator

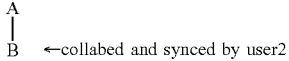

B gets uncollabed:
    B is collabed with user2 and user2 has it synced
    B is uncollabed = sync on B for user2 is gone test_uncollaborating_a_subfolder_removes_sync_from_deeper_folder_for_collaborator()

Tests that a synced subfolder of a collab removes sync for collab,
and keeps for owner

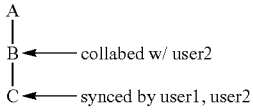

B is collabed:
    user2 sync on C is gone
    user1 sync on C is still there
B = $this.parent_folder, C = $sync_folder test_changing_collab_permissions_to_viewer_unsyncs_folder_for_collaborator()

Tests one root folder synced by a collaborator removes sync when
collaborators permission changes to viewer
    A ← collbed, synced by user1,user2
User2's collab permission gets changed to 'viewer'
    sync on A for user2 should disappear
    sync on A for user1 should remain
A = $this→folder Move Tests:

test_implicit_synced_to_unsynced_updates_table()

Test that moving an implicity SYNCED folder into an UNSYNCED
folder updates the tree correctly
    (@NOTE: "implicity synced" means the item inherits SYNCED
state synced from a synced folder above)

| Move Tests: |
| --- | sets up:

Where A is fully synced.
B is moved to C making:

Where A and C are fully synced
A = $this→parent_folder, B = $this→implicit_sync, C = $this→unsynced
The following assert blocks for move tests are different than the previous tests in that
each assert block is run 3 times:
1. A single user scenario with no collaborators on any folders.
2. A collaborator sharing the top-level folders and syncing the same folders as the owner.
The changes the changes to the sync tree for the collaborator should match the owner in
all of the move operations.
3. The owner collaborates a subfolder with another user, creating a siutation where
the owner and collaborator's trees do not have the same structure.
assert_move_partially_synced_to_unsynced_updates_table()

Test that moving a PARTIALLY_SYNCED folder (not FILES_ONLY_SYNCED) to UNSYNCED folder updates the tree correctly
This method creates:

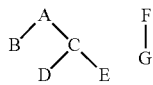

Where A and F are root level belonging to a single user and B and D are synced
and F is files_only Synced.
C is moved to G to make:

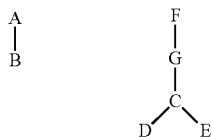

Where A and D are fully synced.
A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_synced_to_unsynced_updates_table()

Test that moving an explicitly SYNCED folder to an UNSYNCED folder updates the tree correctly This method creates:

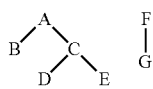

Where A and F are root level belonging to a single user and B and D are synced
and F is files_only Synced.

-continued

Move Tests:

Where D is moved to E making:

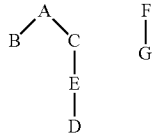

Where A is fully synced and F remains files only synced
A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_files_only_synced_to_files_only_synced_updates_table()

Test that Moving a FILES_ONLY_SYNCED folder to a FILES_ONLY_SYNCED folder updates the tree correctly.
uses set_up_two_files_only_trees
Creates:

Where B and D are files only served.
B is moved to D making:

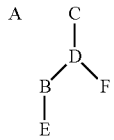

Where A is fully synced, B remains files only synced, and D no longer has a files_only sync row
A = $this→parent_folder, B = $this→files_only_child, C = $this→second_parent, D = $this→second_files_only_child
(E and F are unused, but are needed so that when they update, B and D don't become synced (like they would be without E and F).
assert_move_partially_synced_to_files_only_synced_updates_table()

Test that Moving a PARTIALLY_SYNCED folder to a FILES_ONLY_SYNCED folder updates the tree correctly
This method creates:

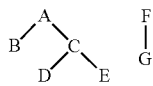

Where A and F are root level belonging to a single user and B and D are synced
and F is files_only Synced.
C is moved to F making:

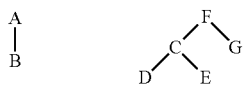

Where A and D are fully synced, and F looses it's files_only sync row.
A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_synced_to_files_only_synced_updates_table()

Test that Moving a SYNCED folder to a FILES_ONLY_SUNCED folder updates the tree correctly

| Move Tests: |
|---|
| This method creates:

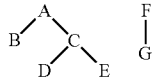

Where A and F are root level belonging to a single user and B and D are synced
    and F is files_only Synced.
    D is moved to F making:

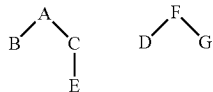

Where B & D are fully synced, C is files_only synced, and F looses its files_only sync row
    A = $this→parent_folder, B = $this→other_child, C = $this→mid_parent
    D = $this→original_two_level_down_sync→item(), E = $this→unsynced_child
    F = $this→second_parent, G = $this→second_unsynced_child
assert_move_unsynced_to_files_only_synced_updates_table() |
| Test that Moving and UNSYNCED folder to a FILES_ONLY_SYNCED folder updates the tree correctly
    This method creates:

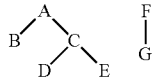

Where A and F are root level belonging to a single user and B and D are synced
    and F is files_only Synced.
    E is moved to F making:

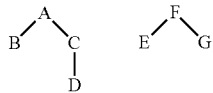

Where A is fully synced, and F remains files only synced
    A = $this→parent_folder, B = $this→other_child, C = $this→mid_parent
    D = $this→original_two_level_down_sync→item(), E = $this→unsynced_child
    F = $this→second_parent, G = $this→second_unsynced_child
assert_move_files_onl_synced_to_partially_synced_updates_table() |
| Test that Moving an FILES_ONLY_SYNCED folder to a PARTIALLY_SYNCED folder updates the tree correctly
    Most of these tests use set_up_multiple_trees if not, it will be noted.
    This method creates:

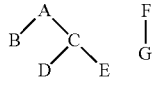

Where A and F are root level belonging to a single user and B and D are synced
    and F is files_only Synced.
    Moving F to C makes:

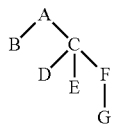

Where B and D are fully synced, and F remains files inly synced |

Move Tests:

A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_partially_synced_to_partially_synced_updates_table()
Test that Moving a PARTIALLY_SYNCED folder to a PARTIALLY_SYNCED folder updates the tree correctly
uses set_up_two_files_only_trees
Creates:

Where B and D are files only synced.
A is moved to C making:

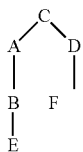

Where B and D keep their files_only sync rows
A = $this→parent_folder, B = $this→files_only_child, C = $this→second_parent, D = $this→second_files_only_child
(E and F are unused, but are needed so that when they update, B and D don't become synced (like they would be without E and F).
assert_move_synced_to_partially_synced_updates_table()

Test that Moving a SYNCED folder to a PARTIALLY_SYNCED folder updates the tree correctly
This method creates:

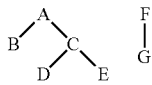

Where A and F are root level belonging to a single user and B and D are synced
and F is files_only Synced.
Move D to A makes

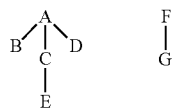

Where B and D are fully synced, C is files_only synced, and F remains files_only synced
A = $this→parent_folder, B = $thisother_child, C = $this→mid_parent
D = $this→original_two_level_down_sync→item(), E = $this→unsynced_child
F = $this→second_parent, G = $this→second_unsynced_child
assert_move_unsynced_to_partially_synced_updates_table()

Test that Moving an UNSYNCED folder to a PARTIALLY_SYNCED folder updates the tree correctly
This method creates:

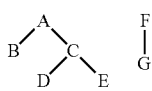

Where A and F are root level belonging to a single user and B and D are synced
and F is files_only Synced.
E is moved to A making

| Move Tests: |
| --- |

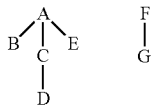

Where C and B are fully synced, and F remains files_only syned
A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_files_only_synced_to_synced_updates_table()

Test that Moving an FILES_ONLY_SYNCED folder to a SYNCED folder updates the tree correctly
This method creates:

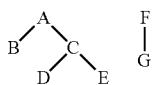

Where A and F are root level belonging to a single user and B and D are synced
and F is files_only Synced.
F is moved to D making:

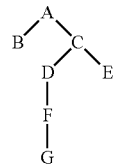

Where B and D are fully synced, and F loses its files_only sync row
A = $this→parent_folder, B = $this→other_child, C = $this→mid_parent
D = $this→original_two_level_down_sync→item(), E = $this→unsynced_child
F = $this→second_parent, G = $this→second_unsynced_child
assert_move_partially_synced_to_syned_updates_table()

Test that moving a PARTIALLY_SYNCED folder to a SYNCED folder updates the tree correctly
This method creates:

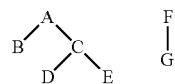

Where A and F are root level belonging to a single user and B and D are synced
and F is files_only Synced.
A = $this→parent_folder, B = $this→other_child, C = $this→mid_parent
C is moved to B making:

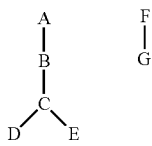

Where A is fully synced and F keeps its files_only sync
D = $this→original_two_level_down_sync→item(), E = $this→unsynced_child
F = $this→second_parent, G = $this→second_unsynced_child
assert_move_synced_to_synced_updates_table()

Test that Moving an SYNCED to a SYNCED folder updates the tree correctly

Move Tests:

This method creates:

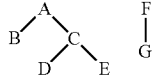

Where A and F are root level belonging to a single user and B and D are synced
and F is files_only Synced.
D moves to B making:

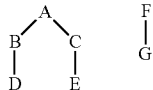

Where B is fully synced, C is files_only synced, and F keeps its files_only sync
A = $this→parent_folder, B = $this→other_child, C = $this→mid_parent
D = $this→original_two_level_down_sync→item(), E = $this→unsynced_child
F = $this→second_parent, G = $this→second_unsynced_child

---

Figure 4A:
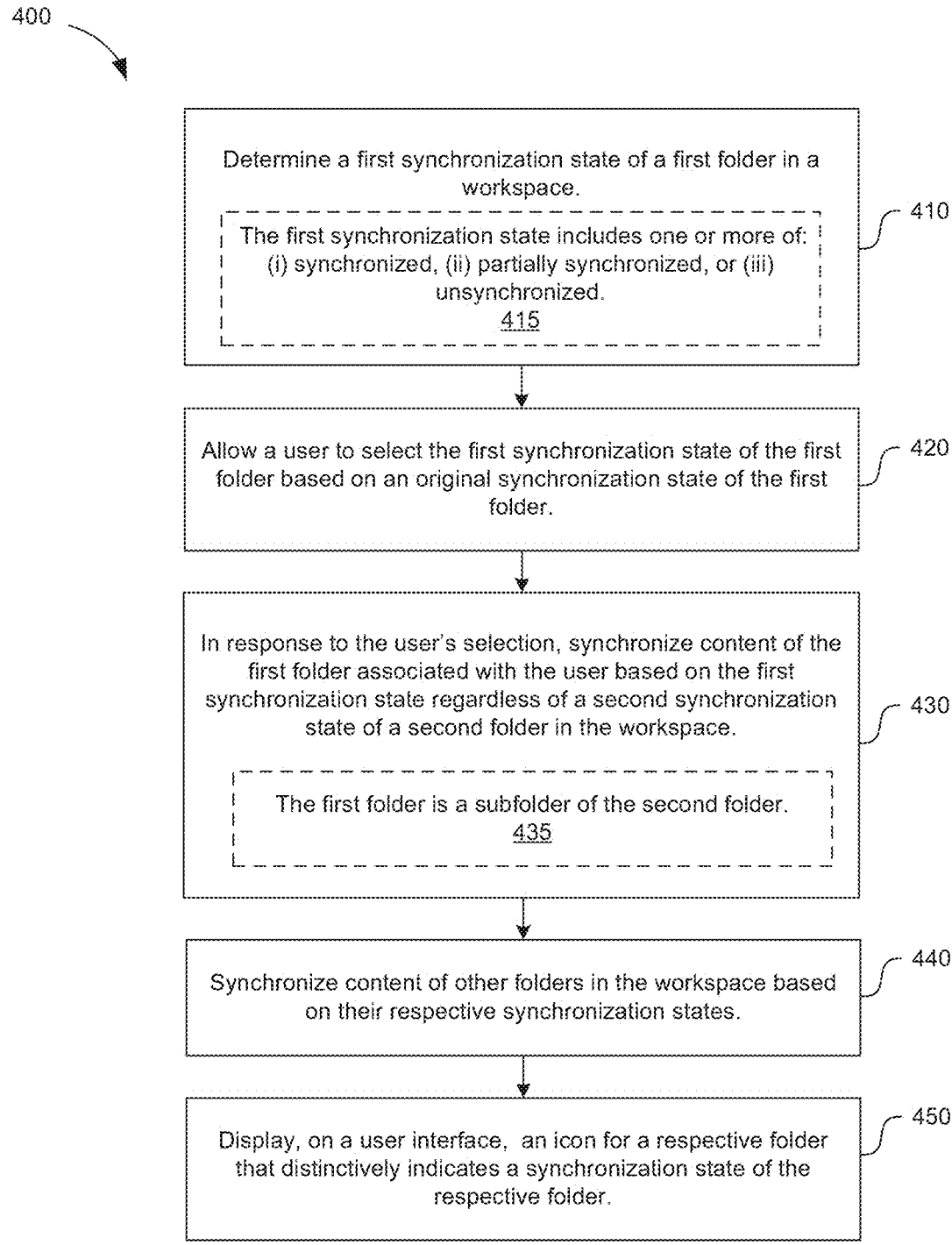
FIG. 4A depicts a flowchart illustrating an example process for a server selectively synchronizing one or more subfolders in a workspace with a client.

FIG. 4A depicts a flowchart illustrating an example process 400 for a server (e.g., the host server 110, FIG. 1) selectively synchronizing one or more subfolders in a workspace (e.g., workspace 302, FIGS. 3A-3B) of a cloud-based environment with a client (e.g., on client devices 102, FIG. 1). The process 400 is performed, for example, by a processor that is included on the server 110. Workspace 302 (e.g., workspaces A 205, B 225, or N 245, FIG. 2) is shared among a user of the client devices 102 and one or more collaborators (e.g., collaborators 108, FIG. 1) of the user. The host server 110 is a server that hosts the cloud-based environment.

According to one or more embodiments, the host server 110 determines (410) a first synchronization state of a first folder (e.g., one of folders 342, FIG. 3B). The first synchronization state can include (415) one or more of: (i) synchronized, (ii) partially synchronized, or (iii) unsynchronized. Then, the host server 110 allows (420) the user to select the first synchronization state of the first folder based on an original synchronization state of the first folder. For example, if the first folder is originally synchronized, then the user can disable the first synchronization state to unsynchronized. If the first folder is originally unsynchronized, then the user can enable the first synchronization state to synchronized. If the first folder is originally partially synchronized, then the user can either enable or disable the first synchronization state.

Thereafter, in response to the user's selection, the host server 110 synchronizes (430) content of the first folder associated with the user based on the first synchronization state regardless of a second synchronization state of a second folder in the workspace 302. In some embodiments, the first folder is (435) a subfolder of the second folder. Additionally, the host server 110 synchronizes (440) content of other folders in the workspace 302 based on their respective synchronization states.

Furthermore, in one or more embodiments, the host server 110 displays (450) on a user interface (e.g., user interface 104), an icon for a respective folder that distinctively indicates a synchronization state of the respective folder. For example, the host server 110 can use a first image for the state of the respective folder being synchronized, another image for the state of the respective folder being partially synchronized, and yet another image for the state of the respective folder being unsynchronized.

Figure 4B:
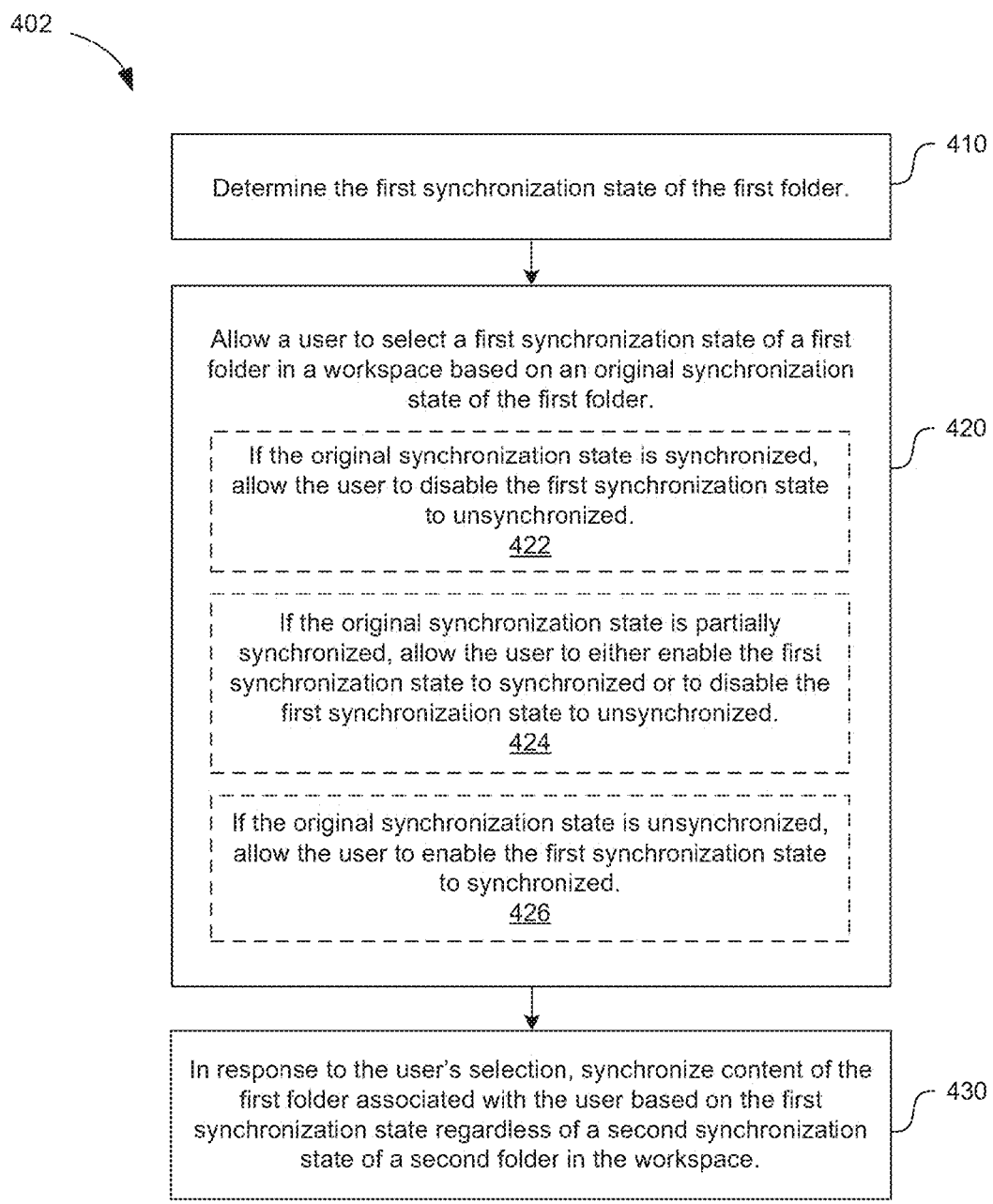
FIGS. 4B-4C respectively depict flowcharts illustrating further details of the process of FIG. 4A in accordance with some embodiments.
Figure 4C:
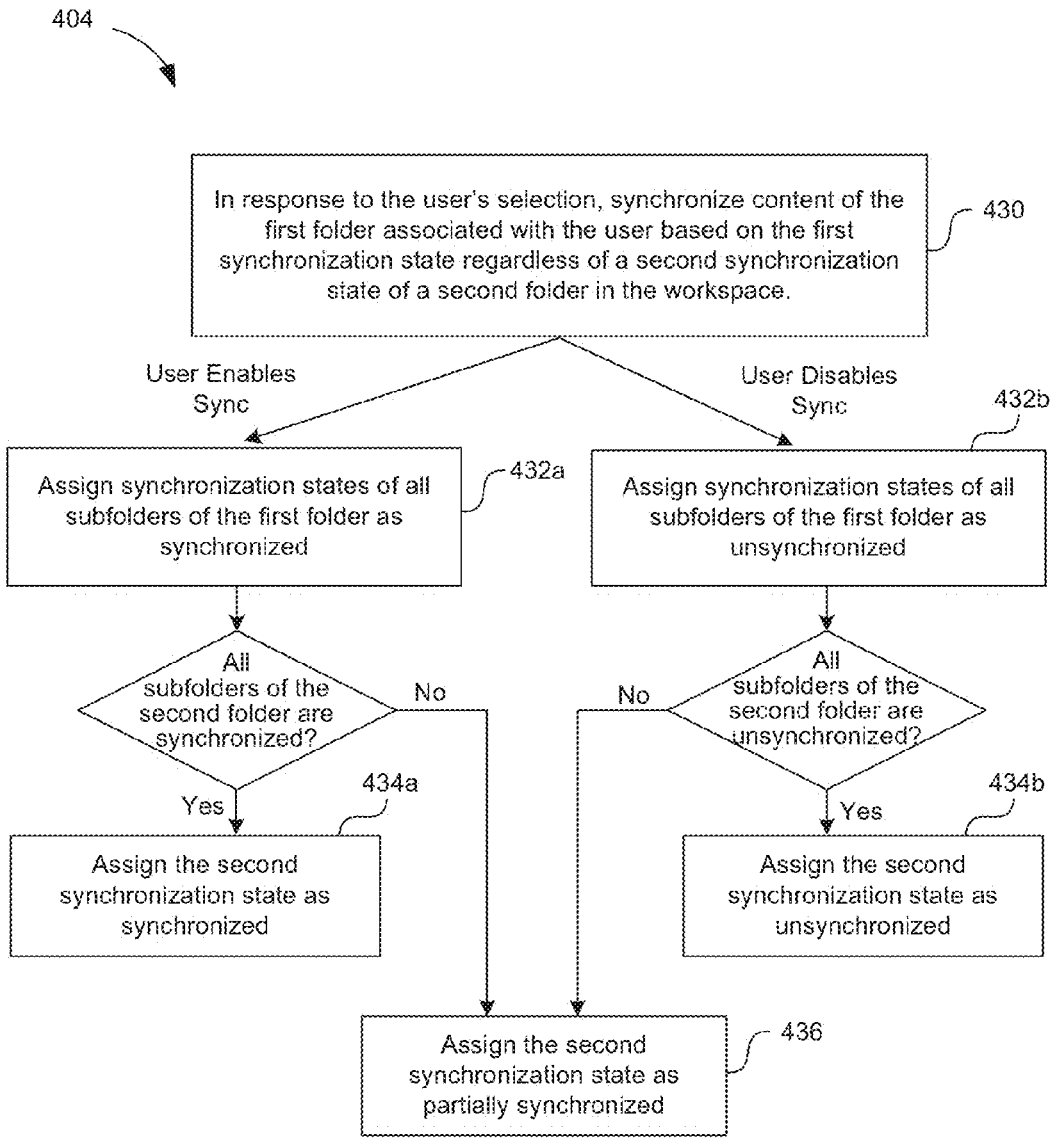

FIGS. 4B-4C respectively depict flowcharts illustrating further details of the process of FIG. 4A in accordance with some embodiments. In FIG. 4B, the operations 410 and 430 are performed as described for the process 400 (FIG. 4A). After operation 410, if the original synchronization state is synchronized, then the host server 110 allows (422) the user to disable the first synchronization state to unsynchronized. If the original synchronization state is partially synchronized, then the host server 110 allows (424) the user to either enable the first synchronization state to synchronized or to disable the first synchronization state to unsynchronized. If the original synchronization state is unsynchronized, then the host server 110 allows (426) the user to enable the first synchronization state to synchronized.

In FIG. 4C, the operations 430 are performed as described for the process 400 (FIG. 4A). Additionally, in some embodiments, if the user enables the first synchronization state, then the host server 110 assigns (432A) synchronization states of all subfolders of the first folder as synchronized. If the user disables the first synchronization state, then the host server 110 assigns (432B) synchronization states of all subfolders of the first folder as unsynchronized.

Further, in response to the user's selection, the host server 110 can automatically update the synchronization state of the second folder, of which the first folder is a subfolder. For example, if all subfolders of the second folder are synchronized, then the host server 110 assigns (434A) the second synchronization state as synchronized. If all subfolders of the second folder are unsynchronized, then the host server 110 assigns (434B) the second synchronization state as unsynchronized. In response to the selection, if not all subfolders of the second folder are all synchronized or all unsynchronized, then the host server 110 assigns (436) the second synchronization state as partially synchronized. In some embodiments, the update is recursively performed by the server 110 to all folders related to the first folder, including ascendant and/or decedent folders.

Figure 5:
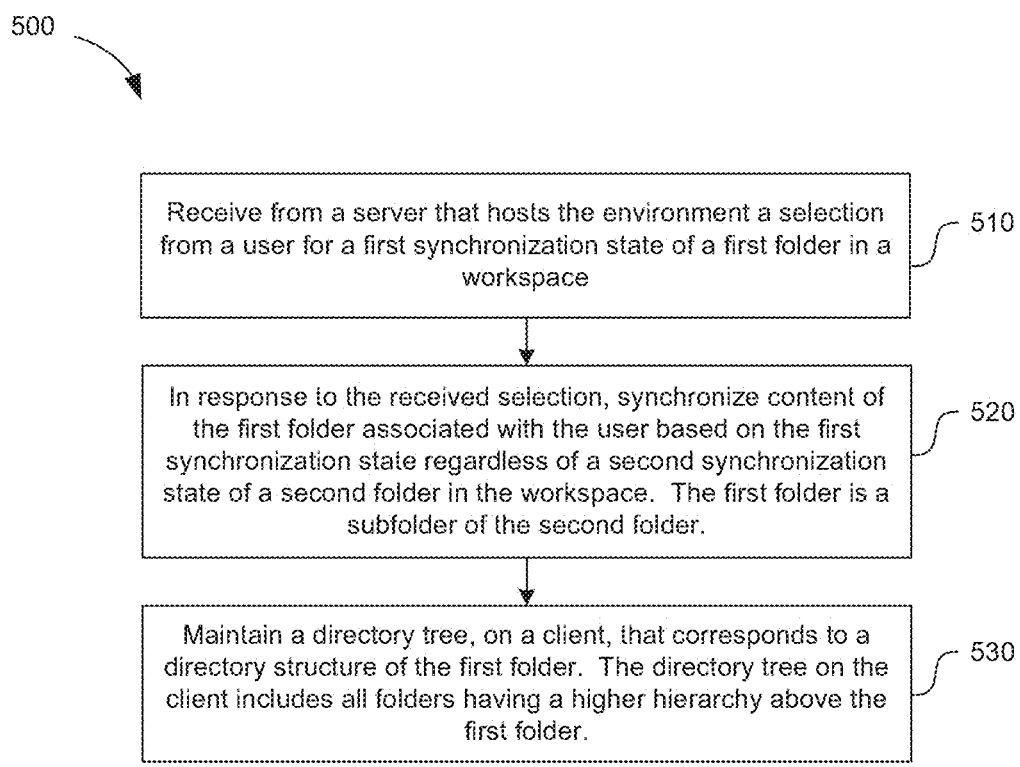
FIG. 5 depicts a flowchart illustrating an example process for a client selectively synchronizing one or more subfolders in a workspace with a server.

FIG. 5 depicts a flowchart illustrating an example process 500 for a client (e.g., client devices 102, FIG. 1) selectively synchronizing one or more subfolders in a workspace (e.g., workspace 302, FIGS. 3A-3B) with a server (e.g., host server 110, FIG. 1). The process 500 is performed, for example, by a processor (not shown for simplicity) that is included on the client device 102. Workspace 302 (e.g., workspaces A 205, B 225, or N 245, FIG. 2) is shared among a user of the client devices 102 and one or more collaborators (e.g., collaborators 108, FIG. 1) of the user. The host server 110 is a server that hosts the cloud-based environment.

According to one or more embodiments, the client devices 102 can receive (510) from the host server 110 a selection from the user for the first synchronization state of the first folder in the workspace 302, and, in response to the received selection, the client devices 102 synchronize (520) content of the first folder associated with the user based on the first synchronization state regardless of a second synchronization state of a second folder in the workspace 302. In response to the received selection, the client devices 102 can additionally synchronize content of other folders in the workspace 302 with data stored on the client devices 102 based on their respective synchronization states.

The client devices 102 can further maintain (530), on the client devices 102, a directory tree that corresponds to a directory structure of the first folder. In some embodiments, the directory tree on the client devices 102 includes all folders having a higher hierarchy above the first folder.

Figure 6:
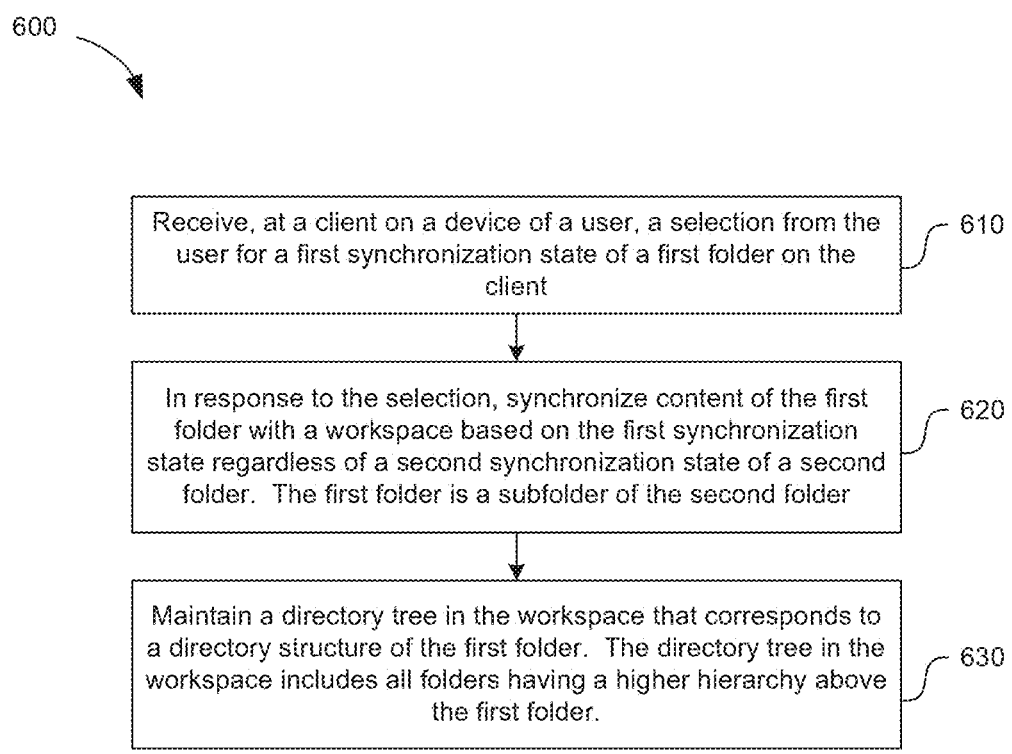
FIG. 6 depicts a flowchart illustrating an example process for a client selectively synchronizing one or more subfolders on the client with a server.

FIG. 6 depicts a flowchart illustrating an example process 600 for a client (e.g., client devices 102, FIG. 1) selectively synchronizing one or more subfolders on the client with a server (e.g., host server 110, FIG. 1). The process 600 is performed, for example, by a processor (not shown for simplicity) that is included on the client device 102. Workspace 302 (e.g., workspaces A 205, B 225, or N 245, FIG. 2) is shared among a user of the client devices 102 and one or more collaborators (e.g., collaborators 108, FIG. 1) of the user. The host server 110 is a server that hosts the cloud-based environment.

According to one or more embodiments, the client devices 102 can receive (610), at the client devices 102, a selection from the user for a synchronization state of a folder on the client device 102, and in response to the selection, the client devices 102 synchronize (620) content of the folder on the client devices 102 with the workspace 302 based on the synchronization state of the folder regardless of a synchronization state of another folder. In some embodiments, the folder is a subfolder of the another folder. In some embodiments, in response to the selection, the client device 102 can further synchronize content of other folders on the client device 102 with the workspace 302 based on their respective synchronization states.

Also, one or more embodiments provide that the client devices 102 maintain (630) a directory tree in the workspace 302 that corresponds to a directory structure of the folder on the client device 102. The directory tree in the workspace can include all ascendant folders having a higher hierarchy above the folder on the client devices 102. Specifically, the client devices 102 can communicate to the host server 110 relevant information for the server 110 to perform actions suitable to synchronize, in the workspace 302, the content and the directory structure of the first folder.

In one implementation, if the user enables the synchronization state of the folder on the client devices 102 and if the folder is deleted, the client devices 102 can communicate to the host server 110 to delete a folder in the workspace 302 that corresponds to the first folder on the client devices 102.

For an additional or alternative implementation, the client device 102 may, in response to the user creating the first folder, if a folder that corresponds to the first folder does not exist in the workspace 302, then the client devices 102 request the host server 110 to create the folder that corresponds to the first folder in the workspace 302 for synchronization. On the other hand, if the folder that corresponds to the first folder already exists in the workspace 302, then the client requests the host server 110 to create a conflicting folder in the workspace 302 for synchronization. In this way, risk of accidental overwriting data can be minimized.

Overall, the techniques disclosed herein provide fine-grained control to the users of a cloud collaboration environment over what folder(s) in their workspace is to be shared and/or synchronized, thereby reducing the amount of unnecessary and/or inappropriate information traffic over computer networks, especially in shared, collaborative environments.

Figure 7:
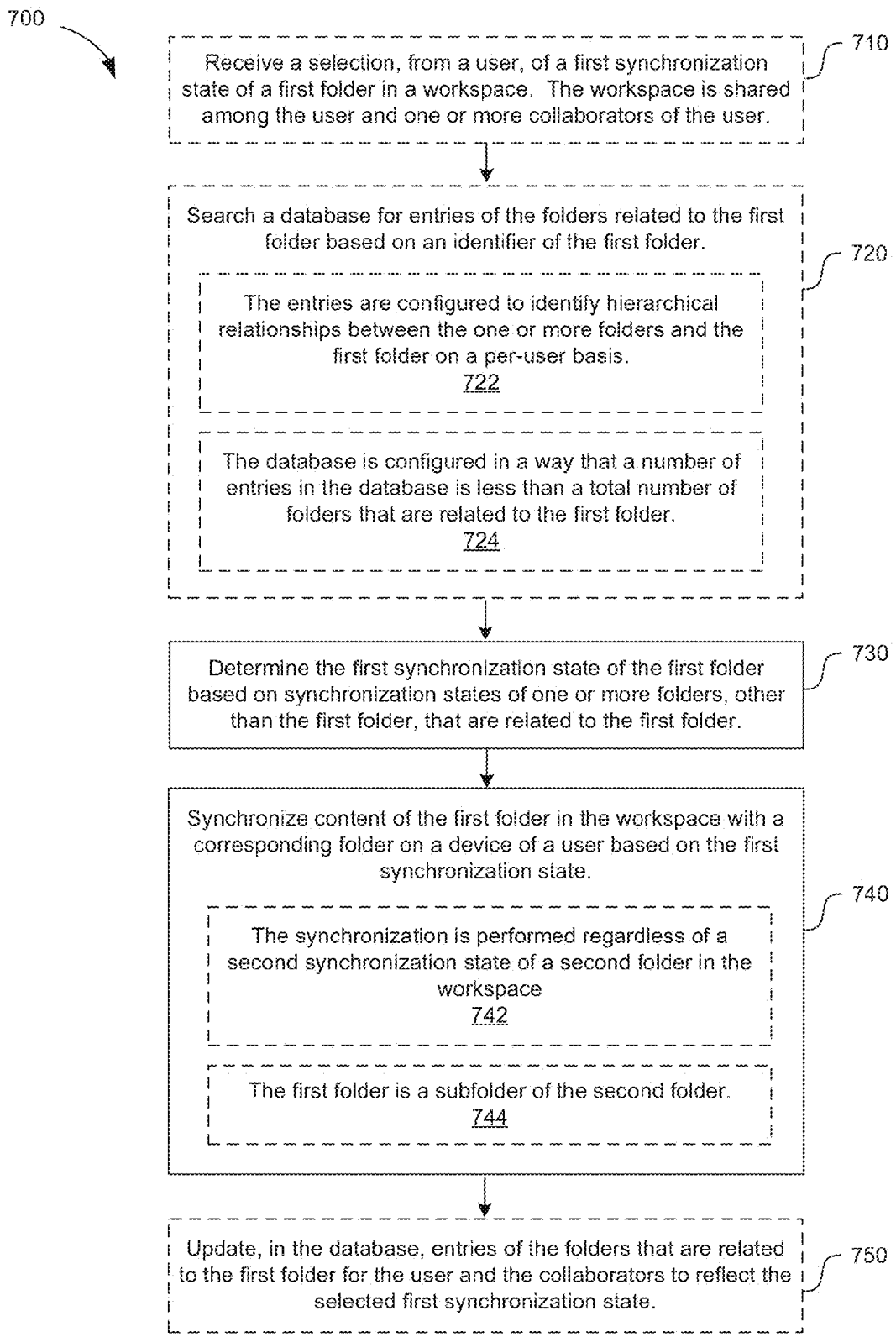
FIG. 7 depicts a flowchart illustrating an example process for a server selectively synchronizing one or more subfolders in a workspace with multiple clients operated by the user and the collaborators.

FIG. 7 depicts a flowchart illustrating an example process 700 for a server (e.g., the host server 110, FIG. 1) selectively synchronizing one or more subfolders in a workspace (e.g., workspace 302, FIGS. 3A-3B) with multiple clients operated by the user and the collaborators. The host server 110 implements the database entry reduction techniques (e.g., in repository 130 including the database 360, FIGS. 1 and 3D) described above including, for example, those described with regard to FIG. 3D.

According to one or more embodiments, the host server 110 receives (710) a selection, from a user (e.g., user 316, FIG. 3A), of a first synchronization state of a first folder in a workspace 302. The workspace 302 is shared among the user and one or more collaborators (e.g., collaborators 322, FIG. 3A) of the user 316. In some embodiments, the selection is received from the user's device (e.g., devices 304-314, FIG. 3A). In some embodiments, the selection is received from a web interface (e.g., user interface 104, FIG. 1) of the host server 110 of the cloud-based environment.

Then, in some embodiments, the host server 110 searches (720) the database 360 for entries (e.g., entries 361-365) of the folders related to the first folder based on an identifier of the first folder. In some embodiments, the entries are configured (722) to identify hierarchical relationships between the one or more folders and the first folder on a per-user basis. In one or more embodiments, the database 360 is configured (724) in a way that a number of entries in the database 360 is less than a total number of folders that are related to the first folder.

Next, based on the search results, the host server 110 determines (730) the first synchronization state of the first folder based on synchronization states of one or more folders, other than the first folder, that are related to the first folder.

Thereafter, the host server 110 synchronizes (740) content of the first folder in the workspace 302 with a corresponding folder on a device of a user based on the first synchronization state. The synchronization can be performed (742) regardless of a second synchronization state of a second folder in the workspace. The first folder can be (744) a subfolder of the second folder.

In additional or alternative embodiments, the host server 110 can also update (750), in the database 360, entries of the folders that are related to the first folder for the user and the collaborators to reflect the selected first synchronization state.

Figure 8:
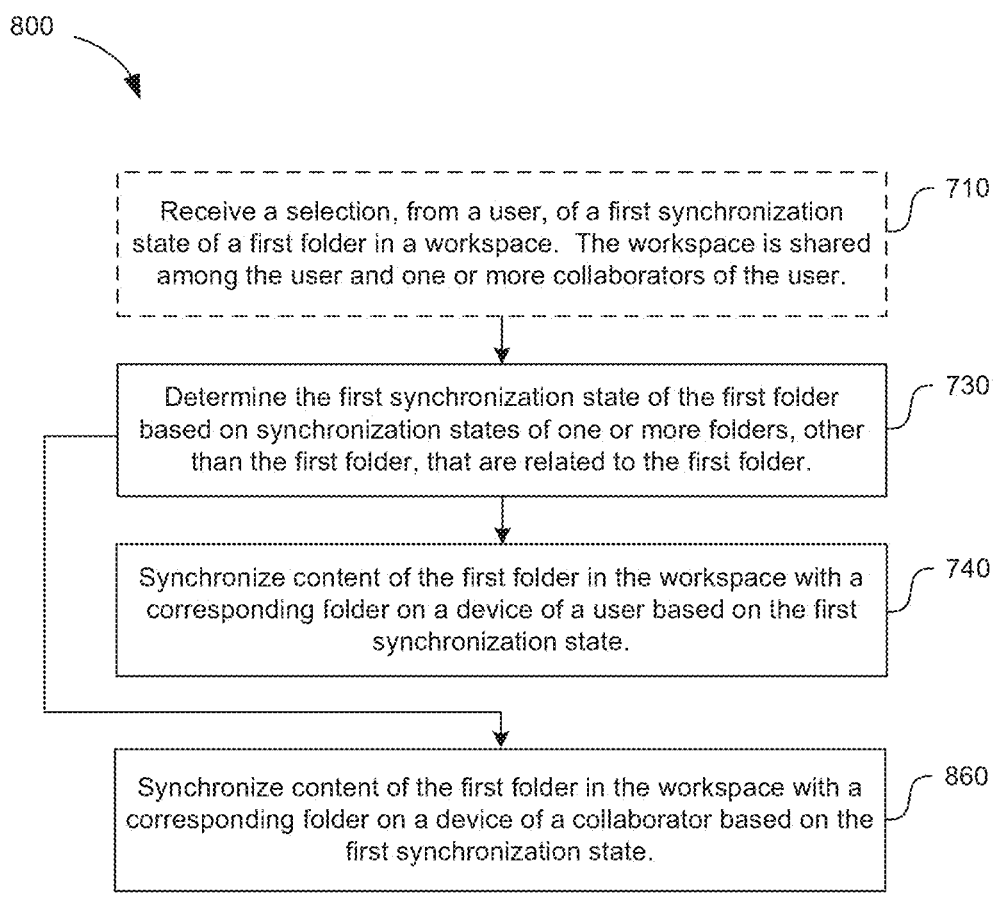
FIG. 8 depicts a flowchart illustrating additional details of the example process of FIG. 7.

FIG. 8 depicts a flowchart 800 illustrating additional details of the example process of FIG. 7. The steps 710, 730, and 740 of flowchart 800 are similar to those of the flowchart 700. The host server 110, however, can also synchronize (860) content of the first folder in the workspace 302 with a corresponding folder on a device of a collaborator based on the first synchronization state, in addition to the step 740.

Hosting Server Embodiment of a Path ID System

Figure 9:
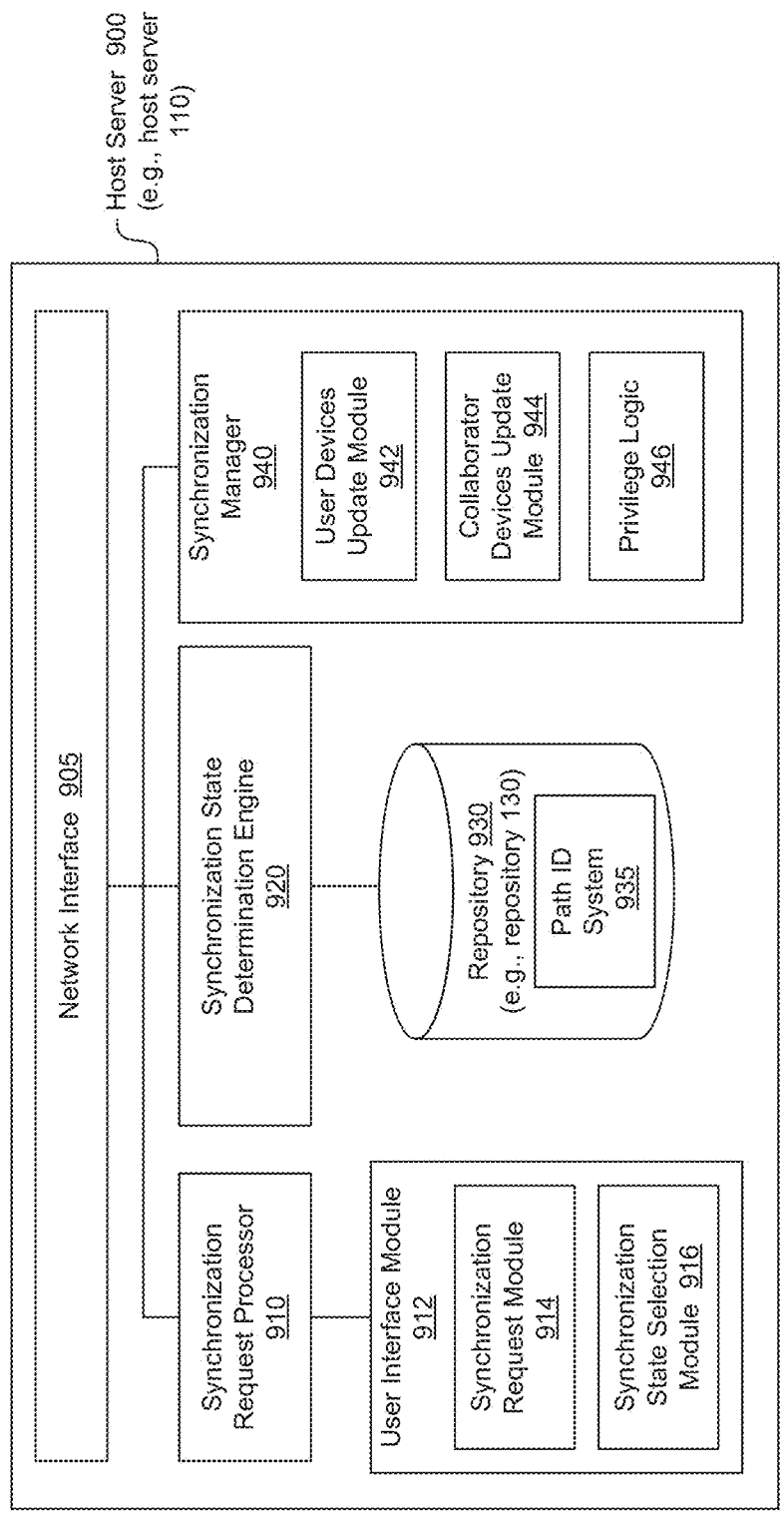
FIG. 9 depicts a block diagram illustrating an example of components in a host server for cloud-based services and storage accounts implementing the database workload reduction techniques disclosed herein.

FIG. 9 depicts a block diagram illustrating an example of components in a host server 900 for cloud-based services and storage accounts implementing the database workload reduction techniques disclosed herein. An example of host server 900 can be the host server 110 of FIG. 1, which is described above.

The host server 900, in one embodiment, hosts a cloud based service and/or cloud based storage service which can include cloud based collaboration and/or file sharing platform. The host server 900 can include, for example, a network interface 905, a synchronization request processor 910 coupled to a user interface module 912, a synchronization state determination engine 920 coupled to a repository 930, and a synchronization manager 940. Additional or less components/modules/engines can be included in the host server 900 and each illustrated component.

The network interface 905 can be a networking module that enables the host server 900 to mediate data in a network with an entity that is external to the host server 900, through any known and/or convenient communications protocol supported by the host and the external entity. The network interface 905 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. §101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 900 includes the synchronization request processor 910 which is able to receive synchronization requests and synchronization state selections from a synchronization request module 914 and synchronization state selection module 916, respectively, of the user interface module 912. The synchronization request module 914 can receive the users' and collaborators' devices synchronization requests, for example, when the synchronization clients (e.g., an application software) running on the devices receives a change notification and requests an update from the host server 900. When a synchronization request is received, the synchronization request module 914 passes the request to the synchronization request processor 910 for further processes in manners described above. Similarly, the synchronization state selection module 916 can receive selections of synchronization states of selective folders in the cloud-based collaboration platform from a user's or a collaborator's device (e.g., via the synchronization client software), or from a web interface of the host server 900. In some embodiments, the user interface module 912 provides application programming interface (API) to allow the synchronization clients as well as, in some additional embodiments, software applications from a third-party to transmit the requests and selections to modules 914 and 916.

The synchronization state determination engine 920 is able to determine synchronization state of a folder of interest based on synchronization states of one or more folders that are related to the folder of interest in ways that are described above. The engine 920 is coupled to the a repository 930 (which can be centralized or distributed) that implements a Path ID system 935 such as described in FIG. 3D. The Path ID system 935 enables the repository 930 to store a number of entries in the database is less than a total number of folders that are related to the folder of interest. The Path ID system 935 also facilitates the synchronization state determination engine 920 to search the repository 930 for entries of the folders related to the folder of interest based on an identifier of the folder of interest, and to determine the synchronization state of the folder of interest based on the search results.

The synchronization manager 940 includes a user devices update module 942, which can update and synchronize content of the selected folder(s) onto the user's devices based on the synchronization selection received by module 916. Similarly, the synchronization manager 940 includes a collaborator devices update module 942, which can update and synchronize content of the selected folder(s) onto the collaborator's devices based on the synchronization selection received by module 916. It is noted that the collaborator devices update module 944 can operate on a per-user (or per-collaborator) basis. Furthermore, the synchronization manager includes a privilege logic to handle all the privilege and access rights of the collaborators, and the collaborator devices update module 944 can consult the privilege logic in performing the updates and synchronization of the collaborators' devices, so that appropriate updates and access controls are enforced.

Figure 10:
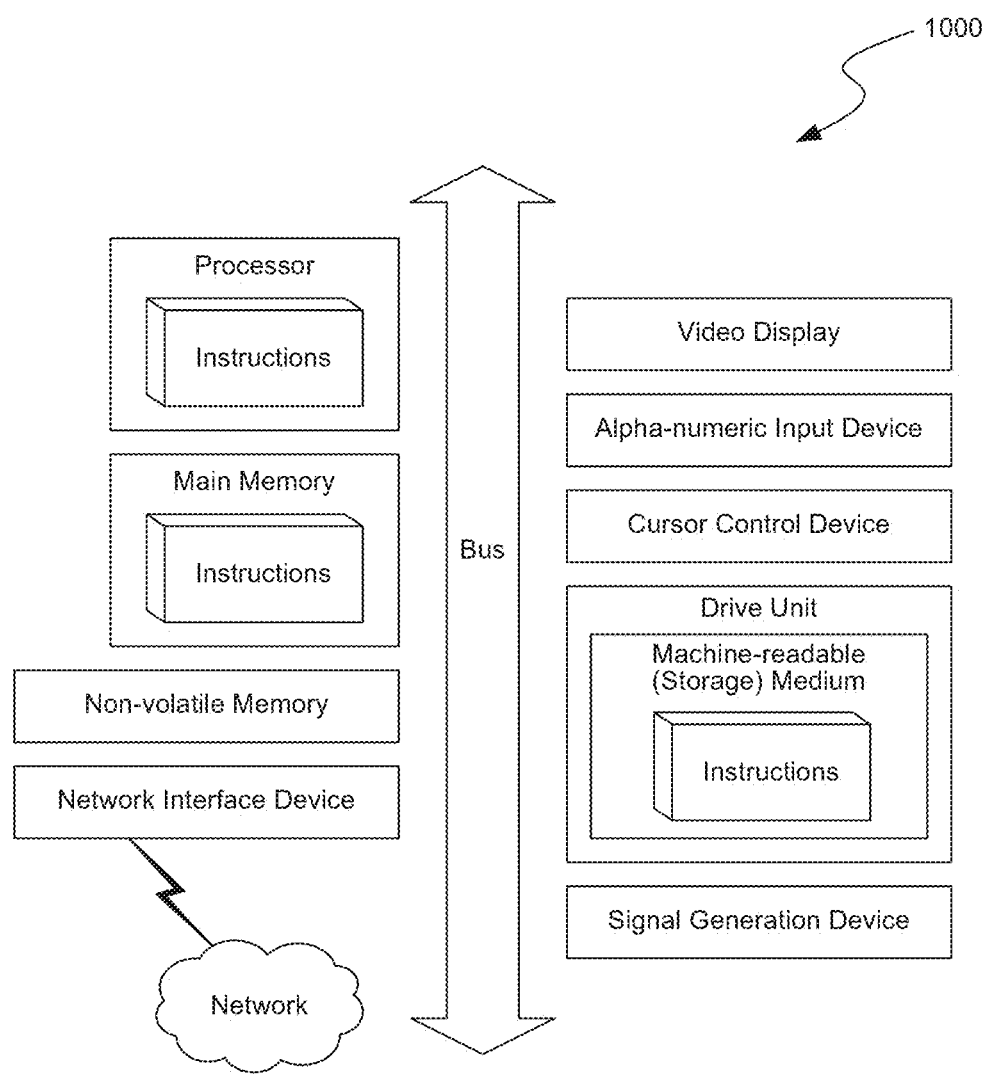
FIG. 10 depicts a diagrammatic representation of a machine in the example form of a computer system within which a set of instructions, for causing the machine to perform any one or more of the methodologies discussed herein, can be executed.

FIG. 10 shows a diagrammatic representation 1000 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶ 6, other aspects can likewise be embodied as a means-plus-function claim, or in other forms, such as being embodied in a computer-readable medium. (Any claim intended to be treated under 35 U.S.C. §112, ¶ 6 begins with the words "means for".) Accordingly, the applicant reserves the right to add additional claims after filing the application to pursue such additional claim forms for other aspects of the disclosure.

What is claimed is:

1. A method for synchronizing selective folders in a workspace of a cloud-based environment, the method comprising:
   determining a current synchronization state of a first folder in a workspace shared among a user and one or more collaborators of the user based on synchronization states of one or more child folders included inside the first folder, wherein the one or more child folders is in one of an unsynchronized state or a synchronized state, wherein the determining includes searching a database for entries of folders that are related to the first folder and comprises:
      if at least one folder in the one or more child folders is unsynchronized, then the current synchronization state of the first folder is determined to be partially synchronized, and wherein a number of entries in the database is less than a total number of the folders that are related to the first folder;
   providing, to a user, options for at least one user-selectable synchronization state of the first folder based on the current synchronization state of the first folder;
   receiving input associated with the user-selectable synchronization state of the first folder in the workspace based on the current synchronization state of the first folder; and input associated with the user-selectable synchronization state of the first folder.

2. The method of claim 1, further comprising:
   synchronizing content of the first folder in the workspace with a corresponding folder on a device of a respective collaborator based on the user-selectable synchronization state.

3. The method of claim 1, wherein the determining is performed on a per-user basis.

4. The method of claim 1, wherein
   searching the database for entries of the folders that are related to the first folder is based on an identifier of the first folder.

5. The method of claim 4, wherein the entries are configured to identify hierarchical relationships between the folders that are related to the first folder and the first folder on a per-user basis.

6. The method of claim 4, wherein the identifier of the first folder is supplied from a client on a device of the user.

7. The method of claim 1, further comprising:
   updating, in the database, entries of the folders that are related to the first folder for the user and the one or more collaborators to reflect the input associated with the user-selectable synchronization state.

8. The method of claim 1, further comprising:
   updating, in the database, entries of the folders that are related to the first folder for the user and the one or more collaborators when the first folder is deleted.

9. The method of claim 1, further comprising:
   updating, in the database, entries of the folders that are related to the first folder for the user and the one or more collaborators when the first folder is moved to another location.

10. The method of claim 1, further comprising:
    updating, in the database, entries of the folders that are related to the first folder for the user and the one or more collaborators when a respective collaborator is removed from collaborating on the first folder.

11. The method of claim 1, further comprising:
    updating, in the database, entries of the folders that are related to the first folder for the user and the one or more collaborators when a collaboration privilege of a respective collaborator is modified to prevent the respective collaborator from accessing the first folder.

12. The method of claim 1, further comprising:
    updating timestamps of the folders that are related to the first folder for the user and the one or more collaborators to reflect the input associated with the user-selectable synchronization state.

13. The method of claim 1, wherein the synchronizing is performed when the user modifies collaboration privileges for the one or more collaborators.

14. The method of claim 13, wherein modification of collaboration privileges is on a per-folder basis.

15. The method of claim 1, wherein the input is received from a device of the user.

16. The method of claim 1, wherein the input is received from a web interface of a host server of the cloud-based environment.

17. The method of claim 1, wherein the determining comprises:
    if each folder in the one or more child folders is synchronized, then the current synchronization state of the first folder is determined to be synchronized.

18. The method of claim 1, wherein the determining comprises:
    if each folder in the one or more child folders is unsynchronized, then the current synchronization state of the first folder is determined to be unsynchronized.

19. A system for synchronizing selective folders in a workspace of a cloud-based environment, the system comprising:
    a processor;
    a memory having stored thereon instructions which, when executed by the processor, causes the processor to:
       determine a current synchronization state of a first folder in a workspace being shared among a user and one or more collaborators of the user based on synchronization states of one or more child folders included inside the first folder, wherein the one or more child folders is in one of an unsynchronized state or a synchronized state, wherein the processor is further caused to search a database for entries of folders that are related to the first folder and comprises:
if each folder in the one or more child folders is synchronized, then the current synchronization state of the first folder is determined to be synchronized, and wherein a number of entries in the database is less than a total number of the folders that are related to the first folder;
providing, to a user, options for at least one user-selectable synchronization state of the first folder based on the current synchronization state of the first folder;
receive a selection of the first synchronization state of the first folder in the workspace based on the original synchronization state of the first folder; and input associated with the user-selectable synchronization state of the first folder.

20. The system of claim 19, wherein the processor is further caused to:
synchronize content of the first folder in the workspace with a corresponding folder on a device of a respective collaborator based on the user-selectable synchronization state.

21. The system of claim 19, wherein the search the database for entries of the folders that are related to the first folder is based on an identifier of the first folder.

22. The system of claim 21, wherein the entries are configured to identify hierarchical relationships between the folders that are related to the first folder and the first folder on a per-user basis.

23. The system of claim 19, wherein the processor is further caused to:
update, in the database, entries of the folders that are related to the first folder for the user and the one or more collaborators to reflect the input associated with the user-selectable synchronization state, and
update, in the database, entries of the folders that are related to the first folder for the user and the one or more collaborators when a collaboration privilege of a respective collaborator is modified to prevent the respective collaborator from accessing the first folder.

24. The system of claim 19, wherein the processor is further caused to:
if at least one folder in the one or more child folders is unsynchronized, then the current synchronization state of the first folder is determined to be partially synchronized.

25. The system of claim 19, wherein the processor is further caused to:
if each folder in the one or more child folders is unsynchronized, then the current synchronization state of the first folder is determined to be unsynchronized.

26. A method for synchronizing selective folders in a workspace of a cloud-based environment, the method comprising:
determining a current synchronization state of a first folder based on synchronization states of one or more child folders included inside the first folder, wherein the one or more child folders is in one of an unsynchronized state or a synchronized state, wherein the determining includes searching a database for entries of folders that are related to the first folder and comprises:
if each folder in the one or more child folders is unsynchronized, then the current synchronization state of the first folder is determined to be unsynchronized, and wherein a number of entries in the database is less than a total number of the folders that are related to the first folder; and
synchronizing content of the first folder in the workspace with a corresponding folder on a device of the user based on the current synchronization state.

27. The method of claim 26, wherein the
searching the database for entries of the folders that are related to the first folder is based on an identifier of the first folder.

28. The method of claim 26, wherein the determining comprises:
if at least one folder in the one or more child folders is unsynchronized, then the current synchronization state of the first folder is determined to be partially synchronized.

29. The method of claim 26, wherein the determining comprises:
if each folder in the one or more child folders is synchronized, then the current synchronization state of the first folder is determined to be synchronized.

30. A method for synchronizing selective folders in a workspace of a cloud-based environment, the method comprising:
receiving a selection of a first synchronization state of a first folder in the workspace based on an original synchronization state of the first folder, wherein the first folder is included in a workspace shared by a user and one or more collaborators of the user;
searching a database for entries of the folders related to the first folder based on an identifier of the first folder, wherein the entries are configured to identify hierarchical relationships between the one or more folders and the first folder on a per-user basis,
wherein the database is configured in a way that a number of entries in the database is less than a total number of folders that are related to the first folder:
determining the first synchronization state of the first folder based on synchronization states of one or more folders, other than the first folder, that are related to the first folder, wherein the original synchronization state of the first folder is determined to be one of an unsynchronized state or a partially synchronized state;
selectively synchronizing content of the first folder in the workspace with a corresponding folder on a device of the user based on the first synchronization state of the first folder, wherein the synchronization is performed by the processor regardless of a second synchronization state of a second folder in the workspace, and wherein the first folder is a subfolder of the second folder; and
updating, in a database, entries of the folders that are related to the first folder for the user and the one or more collaborators to reflect the selected first synchronization state.

* * * * *